US 9,772,607 B2

(12) United States Patent
Decoux et al.

(10) Patent No.: US 9,772,607 B2
(45) Date of Patent: Sep. 26, 2017

(54) METHOD AND SYSTEM FOR AUTHENTICATING A DEVICE

(71) Applicant: SICPA HOLDING SA, Prilly (CH)

(72) Inventors: Eric Decoux, Vevey (CH); Andrea Callegari, Chavannes-pres-Renens (CH)

(73) Assignee: SICPA HOLDING SA, Prilly (CH)

( * ) Notice: Subject to any disclaimer, the term of this patent is extended or adjusted under 35 U.S.C. 154(b) by 316 days.

(21) Appl. No.: 14/466,097

(22) Filed: Aug. 22, 2014

(65) Prior Publication Data
US 2015/0053007 A1    Feb. 26, 2015

Related U.S. Application Data

(60) Provisional application No. 61/956,198, filed on Aug. 27, 2013.

(30) Foreign Application Priority Data

Aug. 23, 2013  (WO) .................. PCT/EP2013/067591

(51) Int. Cl.
G04D 7/12 (2006.01)
G01H 13/00 (2006.01)
(Continued)

(52) U.S. Cl.
CPC ............ G04D 7/1207 (2013.01); G01H 13/00 (2013.01); G04B 18/02 (2013.01); G04C 5/00 (2013.01);
(Continued)

(58) Field of Classification Search
CPC ........ G04D 7/003; G04D 7/005; G04D 7/125; G04D 7/12; G04D 7/1207; G04D 7/1214;
(Continued)

(56) References Cited

U.S. PATENT DOCUMENTS 2,782,627 A    2/1957  Hetzel
3,583,237 A *  6/1971  Bayha .................. G07D 7/00
                                        194/206
(Continued)

FOREIGN PATENT DOCUMENTS

CH    694 111 A5    7/2004
DE    103 38932 A1  3/2005
(Continued)

OTHER PUBLICATIONS

International Search Report and Written Opinion in related application No. PCT/EP2013/067591 dated May 8, 2014.
(Continued)

Primary Examiner — Harshad R Patel
Assistant Examiner — Suman K Nath
(74) Attorney, Agent, or Firm — Greenblum & Bernstein, P.L.C.

(57) ABSTRACT

Method for authenticating a timepiece comprising measuring acoustic vibrations emitted by said timepiece to obtain an electrical signal indicating magnitude information comprising a variation of a magnitude of the measured acoustic vibrations as a function of time. The electrical signal comprises at least one specific tone associated with the presence of a quartz resonator in the timepiece. Method further comprises performing transform of electrical signal into frequency domain to obtain frequency-domain power spectrum indicating variation of power of electrical signal as function of frequency, processing the frequency-domain power spectrum so as to reveal at least one narrow peak in frequency-domain power spectrum corresponding to the at least one specific tone, and extracting at least one resonance frequency corresponding to said at least one narrow peak. Method further comprises comparing extracted at least one resonance frequency with at least one reference resonance
(Continued)

frequency; and determining an authenticity of said timepiece.

46 Claims, 13 Drawing Sheets

(51) Int. Cl.
  *G04C 5/00* (2006.01)
  *G04B 18/02* (2006.01)
  *G04D 7/00* (2006.01)
(52) U.S. Cl.
  CPC .............. *G04D 7/001* (2013.01); *G04D 7/003* (2013.01); *G04D 7/1228* (2013.01)
(58) Field of Classification Search
  CPC ...... G04D 7/1228; G01H 13/00; G01N 29/12; G01N 29/036; G01N 29/348; G01N 2291/014; G04B 18/02
  USPC .......... 73/579, 587, 602, 862.59, 1.46, 1.43, 73/1.48, 1.49
  See application file for complete search history.

(56) References Cited

U.S. PATENT DOCUMENTS

| | | | |
|---|---|---|---|
| 3,690,144 A | 9/1972 | Bonny | |
| 3,756,066 A | 9/1973 | Bolliger | |
| 3,811,315 A | 5/1974 | Kunitomi | |
| 3,817,083 A | 6/1974 | Jucker | |
| 3,864,957 A * | 2/1975 | Fujita | G04F 10/04 73/1.48 |
| 3,892,124 A | 7/1975 | Reese | |
| 3,946,592 A | 3/1976 | Ichikawa | |
| 4,012,941 A | 3/1977 | Jucker | |
| 4,024,750 A | 5/1977 | Erickson | |
| 4,028,927 A | 6/1977 | Kikuyama et al. | |
| 4,078,419 A | 3/1978 | Busch et al. | |
| 4,078,420 A | 3/1978 | Reese | |
| 4,083,222 A | 4/1978 | Stawiski | |
| 4,178,566 A * | 12/1979 | Kawashima | G04F 5/063 310/361 |
| 4,224,820 A | 9/1980 | Sitkewich | |
| 4,320,529 A | 3/1982 | Maeda | |
| 4,452,082 A | 6/1984 | Miwa | |
| 5,572,488 A | 11/1996 | Yamada et al. | |
| 5,619,616 A | 4/1997 | Brady et al. | |
| 7,057,430 B2 | 6/2006 | Ogiso | |
| 7,099,782 B2 * | 8/2006 | Hitchcock | G01M 13/028 702/56 |
| 7,248,985 B2 * | 7/2007 | Dwyer | G01H 1/003 702/103 |
| 7,605,372 B2 | 10/2009 | Hachin | |
| 7,979,731 B2 | 7/2011 | Futa | |
| 2003/0112708 A1 | 6/2003 | Fujisawa et al. | |
| 2004/0113819 A1 | 6/2004 | Gauthey et al. | |
| 2006/0293606 A1 | 12/2006 | Tomita | |
| 2009/0278670 A1 | 11/2009 | Karapatis | |
| 2011/0110200 A1 | 5/2011 | Goeller | |
| 2013/0170327 A1 * | 7/2013 | Peters | G04G 21/00 368/62 |
| 2014/0013846 A1 | 1/2014 | Decoux et al. | |
| 2014/0013847 A1 | 1/2014 | Decoux et al. | |
| 2014/0019089 A1 | 1/2014 | Decoux et al. | |
| 2015/0013460 A1 | 1/2015 | Favre | |
| 2015/0053006 A1 | 2/2015 | Decoux et al. | |

FOREIGN PATENT DOCUMENTS

| | | |
|---|---|---|
| EP | 0 072 350 A1 | 2/1983 |
| EP | 1 021 790 A1 | 7/2000 |
| FR | 2 957 689 A1 | 9/2011 |
| JP | 05264335 | 10/1993 |
| JP | 2010259629 | 11/2010 |
| WO | WO99/19831 A1 | 4/1999 |
| WO | WO99/21061 A1 | 4/1999 |

OTHER PUBLICATIONS

M. Disher, "An Overview of the COSC Certificate and Testing Procedures," pp. 1-4, dated Feb. 12, 2000.

Search Report and Written Opinion in related International Application No. PCT/EP2013/064865, dated Aug. 21, 2013.

* cited by examiner

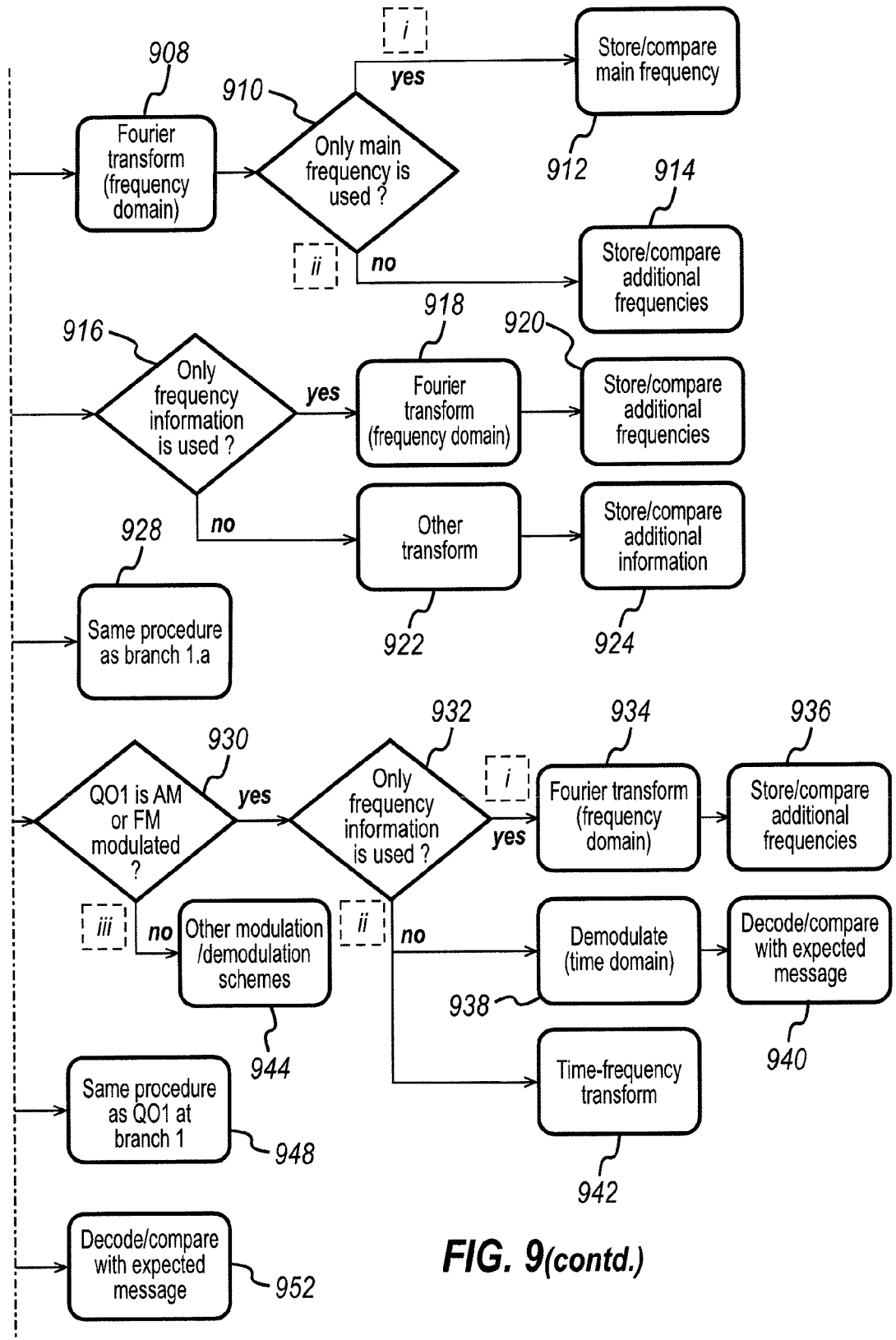
FIG. 9(contd.)

METHOD AND SYSTEM FOR AUTHENTICATING A DEVICE

CROSS REFERENCE TO RELATED APPLICATIONS

The present application claims the benefit of U.S. Provisional Application No. 61/956,198 filed on Aug. 27, 2013, and claims priority to International Application No. PCT/EP2013/067591 filed on Aug. 23, 2013, the disclosures of which are expressly incorporated by reference herein in their entireties.

FIELD OF THE INVENTION

The present invention relates to a method and system for authenticating a timepiece, such as a watch. The method and system may be used for authenticating other devices, for example mobile telephones.

BACKGROUND OF THE INVENTION

Counterfeit consumer goods, commonly called knock-offs, are counterfeit or imitation products offered for sale. The spread of counterfeit goods has become global in recent years and the range of goods subject to counterfeiting has increased significantly.

Watches are vulnerable to counterfeiting, and have been counterfeited for decades. A counterfeit watch is an unauthorized copy of a part or all of an authentic watch. According to estimates by the Swiss Customs Service, there are some 30 to 40 million counterfeit watches put into circulation each year. It is a common cliché that visitors to New York City are approached on the street by vendors with a dozen such counterfeit watches inside their coats, offered at bargain prices. A counterfeit product may look genuine from the outside and contain sub-standard components. Extremely authentic looking, but very poor quality counterfeit watches can sell for as little as twenty dollars. The problem is becoming more and more serious, with the quality of the counterfeits constantly increasing. Counterfeit watches cause an estimated $1 Billion loss per year to the watch industry.

Authentication solutions that have been used for protection of consumer goods from counterfeiting are often based on marking the item with a specific material, code, or marking, engraving, etc. However, these methods modify the nature and the appearance of the object, and this is often not acceptable in the watch (and other luxury items) industry, where the design of the object and its visual appearance is of paramount importance. Additionally, outer marks may be exposed to copy and environmental factors (wear, dirt, etc.). Also, these methods require an active intervention at the time of manufacturing and, correspondingly an important change of the production process.

A quartz clock is a clock that uses an electronic oscillator that is regulated by a quartz crystal to keep time. This crystal oscillator creates a signal with very precise frequency, so that quartz clocks are at least an order of magnitude more accurate than mechanical clocks. The inherent accuracy and low cost of production has resulted in the proliferation of quartz clocks and watches. By the 1980s, quartz technology had taken over applications such as kitchen timers, alarm clocks, bank vault time locks, and time fuses on munitions, from earlier mechanical balance wheel movements, an upheaval known in watchmaking as the quartz crisis.

Timepieces equipped with quartz movements have dominated the wristwatch and clock market since the 1980s, because of the high Q factor and low temperature coefficient of the quartz crystal they are more accurate than the best mechanical timepieces, and the elimination of all moving parts makes quartz timepieces more rugged and eliminates the need for periodic maintenance. The use of quartz movement is most widespread at the lower end of the market, but not limited to it, and moderately- to very-expensive timepieces fitted with a quartz movement are routinely manufactured and sold.

It is desirable, when assessing the authenticity of a timepiece, to have as much information as possible not only on its outer appearance but also on its inner content. It is furthermore desirable not to have to open the timepiece when checking the authenticity, as the operation requires specialized equipment and procedures, which may impact on the performance and/or integrity of the piece (e.g., water tightness), and which may invalidate the manufacturer's warranty.

It is, therefore, desirable to be able to authenticate a timepiece in a manner that is as non-invasive and as reliable as possible without having to open the timepiece.

SUMMARY OF EMBODIMENTS OF THE INVENTION

An aim of the invention is to provide a method for authenticating a timepiece that is non-invasive and reliable.

In accordance with a first aspect of the present invention, there is provided a method of authenticating a timepiece, wherein the timepiece comprises a quartz resonator for emitting a vibration, the method comprising detecting vibrations from said timepiece resulting from the vibration of the quartz resonator for determining the authenticity of the timepiece.

The method may further comprise analysing the detected vibrations to determine the authenticity of the timepiece.

Analysing the detected vibrations may comprise comparing the detected vibrations with reference information for the timepiece for determining the authenticity of the timepiece.

The method may further comprise determining the authenticity of the timepiece based on the comparison.

Analysing the detected vibrations may comprise identifying one or more component frequencies of the vibrations.

The step of identifying one or more component frequencies of the vibrations may comprise using a mathematical algorithm to identify one or more component frequencies of the vibration.

The mathematical algorithm may comprise one of a Fourier transform, a short-time Fourier transform, a Gabor transform, a Wigner transform, and a wavelet transform.

The method may further comprise identifying a resonant frequency of the quartz resonator from one or more of the component frequencies of the vibrations.

Analysing the detected vibrations may comprise identifying a resonant frequency of the quartz resonator from the detected vibrations.

The method may further comprise comparing the identified resonant frequency with a reference frequency range for the timepiece.

The method may further comprise determining an authenticity of the timepiece based on the comparison.

The method may further comprise comparing the identified resonant frequency with a reference resonant frequency for the timepiece The method may further comprise determining an authenticity of the timepiece based on the comparison.

The method may further comprise comparing one or more subsidiary component frequencies of the vibrations with a reference frequency or frequencies for authenticating the timepiece.

The method may further comprise detecting vibrations from said timepiece resulting from the movement of mechanical components of the timepiece, for example from movement of hands of the timepiece, and analyzing said vibrations for determining the authenticity of the timepiece.

The timepiece may comprises a modulator for modulating the vibration of the quartz resonator to encode a signal in the vibrations from the timepiece, and wherein the method may further comprise analysing the detected vibrations to determine the signal encoded by the modulator.

The modulator may be a frequency modulator or an amplitude modulator. Optionally, the modulator may be one or more of a frequency modulator, an amplitude modulator and a phase modulator. The modulator's modulation signal may be an analog signal. The modulator's modulation signal may be a digital signal. The frequency modulation may comprise frequency key-shifting. The frequency modulation may comprise amplitude key-shifting. The frequency modulation may comprise phase-shift keying.

The modulator may encode a time-varying signal, and wherein analysing the detected vibrations may comprise demodulating a signal which represents vibrations from the timepiece to determine the signal encoded by the modulator.

The method may further comprise comparing the determined encoded signal with reference information for the timepiece to authenticate the timepiece.

The method may further comprise determining an authenticity of the timepiece based on the comparison.

The signal encoded by the modulator may convey an identifier for identifying the timepiece, for example a serial number of the timepiece.

The method may further comprise converting the detected vibration of the timepiece into an electrical signal for analysis for determining the authenticity of the timepiece.

Converting the detected vibration of the timepiece into an electrical signal for analysis may comprise converting the detected vibration of the timepiece into an electrical signal using a transducer.

The quartz resonator may have a prong length (L) from 2 to 4 mm, a prong width (W) from 0.2 to 0.6 mm and a prong thickness (T) from 0.1 to 0.4 mm. The quartz resonator may have one of the following dimensions:

Prong length (L)=2.4 mm, Prong width (W)=0.24 mm, Prong thickness (T)=0.13 mm;
Prong length (L)=2.65 mm, Prong width (W)=0.26 mm, Prong thickness (T)=0.12 mm;
Prong length (L)=2.8 mm, Prong width (W)=0.32 mm, Prong thickness (T)=0.12 mm;
Prong length (L)=3.2 mm, Prong width (W)=0.23 mm, Prong thickness (T)=0.10 mm;
Prong length (L)=2.6 mm, Prong width (W)=0.26 mm, Prong thickness (T)=0.12 mm;
Prong length (L)=3.98 mm, Prong width (W)=0.60 mm, Prong thickness (T)=0.40 mm; and
Prong length (L)=3.75 mm, Prong width (W)=0.60 mm, Prong thickness (T)=0.34 mm.

The timepiece may further comprise a transducer for emitting a vibration, and wherein the method may comprise detecting vibrations from the timepiece resulting from the vibration of the transducer for determining the authenticity of the timepiece.

The transducer may comprise a quartz resonator.

The method may further comprise identifying one or more component frequencies of the vibration from the timepiece resulting from the vibration of the transducer, and comparing one or more of the identified component frequencies with a reference frequency or reference frequencies for authenticating the timepiece.

Comparing one or more the of the identified component frequencies with a reference frequency or reference frequencies may comprise comparing a resonant frequency of the transducer and/or a subsidiary frequency of the vibration with a reference frequency for authenticating the timepiece.

The timepiece may comprise a modulator for modulating the vibration of the transducer to encode a signal in the vibrations of the timepiece, and the method may further comprise analysing the detected vibrations to determine the signal encoded by the modulator.

The modulator may be a frequency modulator or an amplitude modulator. Optionally, the modulator may be one or more of a frequency modulator, an amplitude modulator and a phase modulator. The modulator's modulation signal may be an analog signal. The modulator's modulation signal may be a digital signal. The frequency modulation may comprise frequency key-shifting. The frequency modulation may comprise amplitude key-shifting. The frequency modulation may comprise phase-shift keying.

The modulator may encode a time-varying signal, and wherein analysing the detected vibrations may comprise demodulating a signal which represents vibrations from the timepiece to determine the signal encoded by the modulator.

The method may further comprise comparing the determined encoded signal with reference information for the timepiece to authenticate the timepiece.

The method may further comprise determining an authenticity of the timepiece based on the comparison.

The signal encoded by the modulator may convey an identifier for identifying the timepiece, for example a serial number of the timepiece.

The transducer of the timepiece may not be used for time keeping purposes.

The transducer may emit a vibration at a resonant frequency, and the transducer and the quartz resonator may have different resonant frequencies. The transducer and the quartz resonator may have different nominal resonant frequencies. The transducer may not be emitting a vibration at a resonant frequency.

The method may further comprise storing at least one characteristic of the detected vibrations to create a reference for authenticating the timepiece.

The at least one characteristic may comprise one or more of a resonant frequency, a period of the detected vibrations, one or more component frequencies of the detected vibrations, a magnitude of the detected vibrations, a temporal variation of the period of the detected vibrations, a temporal variation of the frequency of the detected vibrations, and a temporal variation of the magnitude of the detected vibrations.

The at least one characteristic may be stored in a database.

The quartz resonator may regulate the time kept by the timepiece.

In accordance with a further aspect of this disclosure, there is provided a timepiece comprising a first quartz resonator for regulating the time kept by the timepiece, and one or more of a transducer for emitting a vibration for authenticating the timepiece and a modulator for modulating vibrations of the first quartz resonator to encode a signal in vibrations of the timepiece.

The transducer may comprise an electroacoustic transducer such as a piezoelectric transducer for example a second quartz resonator.

The timepiece may comprise a transducer for emitting a vibration for authenticating the timepiece, and wherein the timepiece may further comprise a modulator for modulating the vibration of the transducer to encode a signal in vibrations of the timepiece.

In accordance with a further aspect of this disclosure, there is provided a timepiece comprising a first quartz resonator useful for time keeping purposes optionally supporting an encoded signal and optionally at least one transducer optionally supporting an encoded message, said first quartz and at least one transducer emitting a vibration for authenticating the timepiece.

In accordance with a further aspect of this disclosure, there is provided a timepiece authentication system for authenticating a timepiece, wherein the timepiece comprises a quartz resonator for emitting a vibration at a resonant frequency, wherein the timepiece authentication system comprises a detector for detecting vibrations of the timepiece resulting from the vibration of the quartz resonator, and wherein the system is suitable for carrying out the method described herein, and wherein optionally the detector comprises a transducer for converting the vibrations into an electrical signal for analysis, and wherein the system optionally further comprises a processor for processing the electrical signal.

In accordance with a further aspect of this disclosure, there is provided a computer-implemented method of authenticating a timepiece which comprises a quartz resonator for emitting a vibration at a resonant frequency, wherein the method comprises analysing detected vibrations of the timepiece resulting from the vibration of the quartz resonator for determining the authenticity of the timepiece.

Analysing detected vibrations may comprise comparing the detected vibrations with reference information for the timepiece for determining the authenticity of the timepiece.

The computer-implemented method may further comprise determining the authenticity of the timepiece based on the comparison.

Analysing the detected vibrations of the timepiece may comprise determining one or more component frequencies of the vibrations.

Analysing the detected vibrations of the timepiece may comprise identifying a resonant frequency of the quartz resonator.

The computer-implemented method may further comprise comparing the identified resonant frequency with a reference resonant frequency for the timepiece.

The timepiece may comprise a modulator for modulating the vibration of the quartz resonator and/or the timepiece may comprises a transducer for emitting a vibration and a modulator for modulating the vibration of the transducer to encode a signal in the vibrations of the timepiece, wherein the method may comprise analysing the detected vibrations to determine the signal encoded by the modulator or modulators.

Analysing the detected vibrations may comprise demodulating a signal which represents the vibrations of the timepiece to determine the encoded signal.

In accordance with a further aspect of this disclosure, there is provided a computer program comprising executable instructions for execution on a computer, wherein the executable instructions are executable to perform the method described herein.

In accordance with a further aspect of this disclosure, there is provided a database containing at least one characteristic of detected vibrations of one or more timepieces for authenticating the or each timepiece, wherein the or each timepiece comprises a quartz resonator and the detected vibrations result from the vibration of the quartz resonator, and preferably wherein the at least one characteristic comprises one or more of a resonant frequency, a period of the detected vibrations, one or more component frequencies of the detected vibrations, a magnitude of the detected vibrations, a temporal variation of the period of the detected vibrations, a temporal variation of the frequency of the detected vibrations, a temporal variation of the magnitude of the detected vibrations.

In accordance with a further aspect of this disclosure, there is provided a method of creating a reference for authenticating a timepiece which comprises a quartz resonator, comprising detecting vibrations of said timepiece resulting from the vibration of the quartz resonator, and storing at least one characteristic of the detected vibrations to create a reference for authenticating the timepiece, and preferably wherein the at least one characteristic comprises one or more of a resonant frequency, a period of the detected vibrations, one or more component frequencies of the detected vibrations, a magnitude of the detected vibrations, a temporal variation of the period of the detected vibrations, a temporal variation of the frequency of the detected vibrations, and a temporal variation of the magnitude of the detected vibrations.

The method may be used to authenticate any device which comprises a transducer for emitting a vibration, wherein the transducer may be a quartz resonator. For example the method may be used to authenticate a mobile telephone.

We hereby define the following aspects which have not yet been claimed:

A method of authenticating a device, wherein the device comprises a transducer for emitting a vibration, the method comprising detecting vibrations from said device resulting from the vibration of the transducer for determining the authenticity of the device.

The method may further comprise analysing the detected vibrations to determine the authenticity of the device.

Analysing the detected vibrations may comprise comparing the detected vibrations with reference information for the device for determining the authenticity of the device.

The method may further comprise determining the authenticity of the device based on the comparison.

Analysing the detected vibrations may comprise identifying one or more component frequencies of the vibrations.

The step of identifying one or more component frequencies of the vibrations may comprise using a mathematical algorithm to identify one or more component frequencies of the vibration.

The mathematical algorithm may comprise one of a Fourier transform, a short-time Fourier transform, a Gabor transform, a Wigner transform, and a wavelet transform.

The method may further comprise identifying a resonant frequency from one or more of the component frequencies of the vibrations.

Analysing the detected vibrations may comprise identifying a resonant frequency.

The method may further comprise comparing the identified resonant frequency with a reference frequency range for the device.

The method may further comprise determining an authenticity of the device based on the comparison.

The method may further comprise comparing the identified resonant frequency with a reference resonant frequency for the device.

The method may further comprise determining an authenticity of the device based on the comparison.

The method may further comprise comparing one or more subsidiary component frequencies of the vibrations with a reference frequency or frequencies for authenticating the device.

The method may further comprise detecting vibrations from said device resulting from the movement of mechanical components of the device and analyzing said vibrations for determining the authenticity of the device.

The device may comprise a modulator for modulating the vibration of the transducer to encode a signal in the vibrations from the device. The method may comprise analysing the detected vibrations to determine the signal encoded by the modulator.

The modulator may be a frequency modulator or an amplitude modulator.

The modulator may encode a time-varying signal and analysing the detected vibrations may comprise demodulating a signal which represents vibrations from the device to determine the signal encoded by the modulator.

The method may further comprise comparing the determined encoded signal with reference information for the device to authenticate the device.

The method may further comprise determining an authenticity of the device based on the comparison.

The signal encoded by the modulator may convey an identifier for identifying the device, for example a serial number of the device.

The method may further comprise converting the detected vibration of the device into an electrical signal for analysis for determining the authenticity of the device.

Converting the detected vibration of the device into an electrical signal for analysis may comprise converting the detected vibration of the device into an electrical signal using a transducer.

The transducer may comprise a quartz resonator.

The quartz resonator may have a prong length (L) from 2 to 4 mm, a prong width (W) from 0.2 to 0.6 mm and a prong thickness (T) from 0.1 to 0.4 mm. The quartz resonator may have one of the following dimensions:

Prong length (L)=2.4 mm, Prong width (W)=0.24 mm, Prong thickness (T)=0.13 mm;
Prong length (L)=2.65 mm, Prong width (W)=0.26 mm, Prong thickness (T)=0.12 mm;
Prong length (L)=2.8 mm, Prong width (W)=0.32 mm, Prong thickness (T)=0.12 mm;
Prong length (L)=3.2 mm, Prong width (W)=0.23 mm, Prong thickness (T)=0.10 mm;
Prong length (L)=2.6 mm, Prong width (W)=0.26 mm, Prong thickness (T)=0.12 mm;
Prong length (L)=3.98 mm, Prong width (W)=0.60 mm, Prong thickness (T)=0.40 mm; and
Prong length (L)=3.75 mm, Prong width (W)=0.60 mm, Prong thickness (T)=0.34 mm.

The transducer may be a first transducer and the device may further comprise a second transducer for emitting a vibration, for example an electroacoustic transducer such as a piezoelectric transducer for example a quartz resonator, and wherein the method comprises detecting vibrations from the device resulting from the vibration of the second transducer for determining the authenticity of the device.

The method may further comprise identifying one or more component frequencies of the vibration from the device resulting from the vibration of the second transducer, and comparing one or more of the identified component frequencies with a reference frequency or reference frequencies for authenticating the device.

Comparing one or more the of the identified component frequencies with a reference frequency or reference frequencies may comprise comparing a resonant frequency of the second transducer and/or a subsidiary frequency of the vibration with a reference frequency for authenticating the device.

The device may comprise a modulator for modulating the vibration of the second transducer to encode a signal in the vibrations from the device, wherein the method further comprises analyzing the detected vibrations to determine the signal encoded by the modulator.

The modulator may be a frequency modulator or an amplitude modulator.

The modulator may encode a time-varying signal and analysing the detected vibrations may comprise demodulating a signal which represents the vibrations from the device to determine the signal encoded by the modulator.

The method may further comprise comparing the determined encoded signal with reference information for the device to authenticate the device.

The method may further comprise determining an authenticity of the device based on the comparison.

The signal encoded by the modulator may convey an identifier for identifying the device, for example a serial number of the device.

The second transducer of the device may not be used for time keeping purposes. The first transducer of the device may be used for time keeping purposes.

The first transducer and the second transducer may each emit a vibration at a resonant frequency, wherein the resonant frequency of the first transducer is different to the resonant frequency of the second transducer.

The method may further comprise storing at least one characteristic of the detected vibrations to create a reference for authenticating the device.

The at least one characteristic may comprise one or more of a resonant frequency of the detected vibrations, a period of the detected vibrations, one or more component frequencies of the detected vibrations, a magnitude of the detected vibrations, a temporal variation of the period of the detected vibrations, a temporal variation of the frequency of the detected vibrations, and a temporal variation of the magnitude of the detected vibrations.

The at least one characteristic may be stored in a database.

The device may be a timepiece, for example a watch. The transducer may regulate the time kept by the timepiece.

The timepiece may be a component of a mobile telephone.

The device may be a mobile telephone.

Further described but not yet claimed is a device authentication system for authenticating a device, wherein the device comprises a transducer such as a quartz resonator for emitting a vibration, wherein the device authentication system comprises a detector for detecting vibrations from the device resulting from the vibration of the transducer, and wherein the system is suitable for carrying out the method described herein, and wherein optionally the detector comprises a transducer for converting the vibrations into an electrical signal for analysis, and wherein the system optionally further comprises a processor for processing the electrical signal.

Further described but not yet claimed is a computer-implemented method of authenticating a device which comprises a transducer for emitting a vibration, wherein the method comprises analysing detected vibrations of the device resulting from the vibration of the transducer for determining the authenticity of the device.

Analysing detected vibrations may comprise comparing the detected vibrations with reference information for the device for determining the authenticity of the device.

The computer-implemented method may further comprise determining the authenticity of the device based on the comparison.

Analysing the detected vibrations of the device may comprise determining one or more component frequencies of the vibrations.

Analysing the detected vibrations of the device may comprise identifying a resonant frequency of the transducer.

The computer-implemented method may further comprise comparing the identified resonant frequency with a reference resonant frequency for the device.

The device may comprise a modulator, preferably a frequency modulator, for modulating the vibration of the transducer and/or the device may comprise a second transducer for emitting a vibration and a modulator for modulating the vibration of the second transducer to encode a signal in the vibrations from the device, wherein the computer implemented method comprises analysing the detected vibrations to determine the signal encoded by the modulator or modulators.

Analysing the detected vibrations may comprise demodulating a signal which represents the vibrations of the device to determine the encoded signal.

Further described but not yet claimed is a computer program comprising executable instructions for execution on a computer, wherein the executable instructions are executable to perform the method described herein.

The device may comprise a first transducer for emitting a vibration and one or more of a second transducer for emitting a vibration for authenticating the device and a modulator for modulating vibrations of the first transducer to encode a signal in vibrations from the device. The first transducer may comprise a quartz resonator which may be used to regulate time kept by the device. The second transducer may comprise a quartz resonator. The device may comprise a modulator for modulating the vibration of the second transducer to encode a signal in vibrations from the device. The device may be a timepiece.

The device may comprise a modulator for modulating the vibration of the transducer, which may be a quartz resonator, to encode a signal in the vibrations from the device. Optionally, the modulator may be one or more of a frequency modulator, an amplitude modulator and a phase modulator. The modulator's modulation signal may be an analog signal. The modulator's modulation signal may be a digital signal. The frequency modulation may comprise frequency key-shifting. The frequency modulation may comprise amplitude key-shifting. The frequency modulation may comprise phase-shift keying. The device may be a timepiece.

The device may comprise a transducer for emitting a vibration, for example an electroacoustic transducer such as a piezoelectric transducer for example a quartz resonator, and wherein the method comprises detecting vibrations of the device resulting from the vibration of the transducer for determining the authenticity of the device. The transducer of the device may be any transducer which is capable of generating an acoustic signal. The main or sole function of the transducer of the device may be for emitting a vibration to authenticate the device.

The device may comprise a first transducer for emitting a vibration and a second transducer for emitting a vibration.

The device may be a timepiece. The first transducer may comprise a quartz resonator. The second transducer may comprise a quartz resonator. The vibration from the first transducer may differ to the vibration from the second transducer by a predetermined characteristic, for example if the first transducer comprises a quartz resonator and the second transducer comprises a quartz resonator then the resonant frequency of the first quartz resonator may differ to the resonant frequency of the second quartz resonator by a predetermined characteristic. The resonant frequency of the first quartz resonator may be twice the resonant frequency of the second quartz resonator. The characteristic difference between the vibration from the first transducer and the vibration from the second transducer may be stored as a reference for a particular device. The device may be authenticated by analyzing detected vibrations of the device to determine a measured characteristic and comparing this measured characteristic with a reference characteristic difference for authenticating the watch. The reference characteristic may be stored, for example in a database, against a serial number of the device. If the measured characteristic is the same or within a certain tolerance of the reference characteristic then the device may be deemed authentic.

The device may comprise two quartz resonators, in other words a first quartz resonator and a second quartz resonator. One of the first quartz resonator and the second quartz resonators may be used for keeping time of the device and the other of the first quartz resonator and the second quartz resonators may not be used for keeping time of the device. The timepiece may comprise a first quartz resonator for time keeping purposes and a second quartz resonator for authentication purposes.

The device may comprise a second transducer, for example a quartz resonator. The device may comprise a modulator for modulating the vibration of the second transducer to encode a signal in the vibrations from the device. The modulator may be one or more of a frequency modulator, an amplitude modulator and a phase modulator. The encoded signal may be an arbitrary message or a predetermined message for example conveying a serial number of the device. Thus, the device may comprise a first transducer for example a quartz resonator and a second transducer for example a quartz resonator. The device may comprise two modulators, the first of which modulates the vibration of the first transducer and the second of which modulates the vibration of the second transducer. The signal encoded by the first modulator may be different to the signal encoded by the second modulator.

Analysing the vibrations may comprise processing the vibrations prior to comparing the detected vibrations with reference information, preferably wherein processing the vibrations comprises one or more of filtering, mixing and demodulating.

BRIEF DESCRIPTION OF THE FIGURES

For a more complete understanding of the invention, as well as other objects and further features thereof, reference may be had to the following detailed description of the invention in conjunction with the following exemplary and non-limiting drawings wherein.

Figure 1:
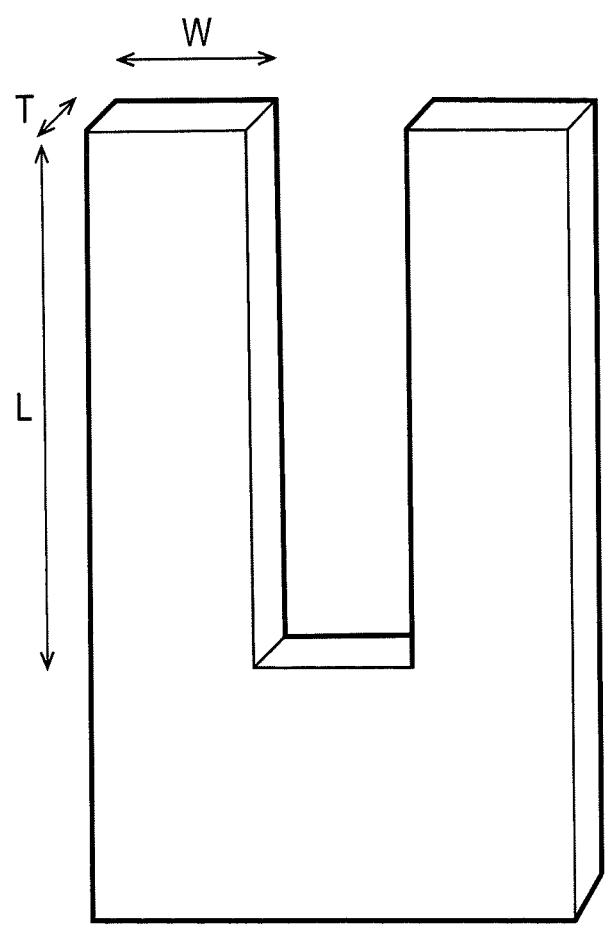
FIG. 1 illustrates a quartz crystal in the shape of a tuning fork.

Reference numbers refer to the same or equivalent parts of the present invention throughout the various figures of the drawings.

DETAILED DESCRIPTION OF EMBODIMENTS OF THE INVENTION

In the following description, the various embodiments of the present invention will be described with respect to the enclosed drawings.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing physical quantities such as frequency, time and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

In the following, acoustic should be intended encompass the sonic, sub-sonic and ultrasonic range, unless otherwise specified. The word acoustic does not limit the vibrations to being within audible range of a human.

The various embodiments disclosed herein can be used separately and in various combinations unless specifically stated to the contrary.

A quartz clock is a clock that uses an electronic oscillator that is regulated by a quartz crystal to keep time. This crystal oscillator creates a signal with very precise frequency, so that quartz clocks are at least an order of magnitude more accurate than mechanical clocks. Generally, some form of digital logic counts the cycles of this signal and provides a numeric time display, usually in units of hours, minutes, and seconds.

Quartz has a further advantage in that its size does not change much as temperature fluctuates. Fused quartz is often used for laboratory equipment that must not change shape along with the temperature, because a quartz plate's resonance frequency, based on its size, will not significantly rise or fall. Similarly, since its resonator does not change shape, a quartz clock will remain relatively accurate as the temperature changes.

The frequency at which the crystal oscillates depends on its shape, size, and the crystal plane on which the quartz is cut. The positions at which electrodes are placed can slightly change the tuning, as well. If the crystal is accurately shaped and positioned, it will oscillate at a desired frequency. In clocks and watches, the frequency is usually 32,768 Hz, and the crystal is cut in a small tuning fork shape on a particular crystal plane. This frequency is a power of two, just high enough so most people cannot hear it, yet low enough to permit inexpensive counters to derive a 1 second pulse. A 15-bit binary digital counter driven by the frequency will overflow once per second, creating a digital pulse once per second. The pulse-per-second output can be used to drive many kinds of clocks.

FIG. 1 illustrates a quartz crystal which has been cut in the shape of a tuning fork, and its dimensions of prong length (L), prong width (W) and prong thickness (T). The quartz resonator may have a prong length of 2.4 mm, a prong width of 0.24 mm, and a prong thickness of 0.13 mm.

The crystal planes and tuning of a clock crystal are designed to operate best at 25° C., the normal temperature of the inside of a watch on a human wrist. A correctly designed watch case forms an expedient crystal oven that uses the stable temperature of the human body to keep the crystal in its most accurate temperature range.

In modern quartz clocks, the quartz crystal resonator or oscillator is in the shape of a small tuning fork, laser-trimmed or precision lapped to vibrate at 32,768 Hz. This frequency is equal to 215 cycles per second. A power of 2 is chosen so a simple chain of digital divide-by-2 stages can derive the 1 Hz signal needed to drive the watch's second hand.

Other frequencies close to 32,768 are also used, in which case the counter is adjusted toa count the appropriate number of pulses per second.

In most clocks, the resonator is in a small can or flat package, about 4 mm long. The reason the 32,768 Hz resonator has become so common is due to a compromise between the large physical size of low frequency crystals for watches and the large current drain of high frequency crystals, which reduces the life of the watch battery.

It has been found that a number of electrically operated devices emit vibrations which are characteristic of their inner content. Notable examples of electrically operated devices include quartz watches and mobile devices (e.g., mobile telephone). Mobile telephones, for example, do not rely upon the microprocessor to maintain proper time, but instead utilize a quartz clock. The emitted vibration can be measured without opening the device, and in accordance with embodiments of the present invention, the vibration's characteristics can be used for authentication and/or identification purposes. Further, in accordance with embodiments of the invention, a device can be tailored to emit a vibration which encodes a specified piece of information (e.g., an identifier).

In embodiments of the invention, a transducer is used to convert the vibration of the item under inspection into a measurable signal, which may then be further processed, recorded, analyzed, stored, and/or compared with a reference signal.

Exemplary transducers include a microphone, an accelerometer, or a vibrometer, converting the vibration into an electrical signal. A contact microphone of the piezoelectric type is well suited for the purpose, as this kind of device can be inexpensive, sensitive to the target vibration and insensitive to airborne acoustic environment (e.g., ambient) noise. Once the signal is captured, the signal is processed to extract information from the signal.

In embodiments of the present invention, processing may include, for example, analog-to-digital conversion, amplifying, filtering (analog/digital), and/or mathematical transforms to and/or from time domain, frequency domain and/or time-frequency domain.

In one exemplary embodiment, the transducer is a stand microphone model 13.1720 supplied by Witschi Electronic, Ltd. The signal from the microphone is sampled at 16 bit, 96 kHz using a sound card, and a length of about 45 seconds of the signal is recorded in digital form. The digital signal is then further transformed to time domain using a Fast Fourier Transform algorithm.

Figure 2:
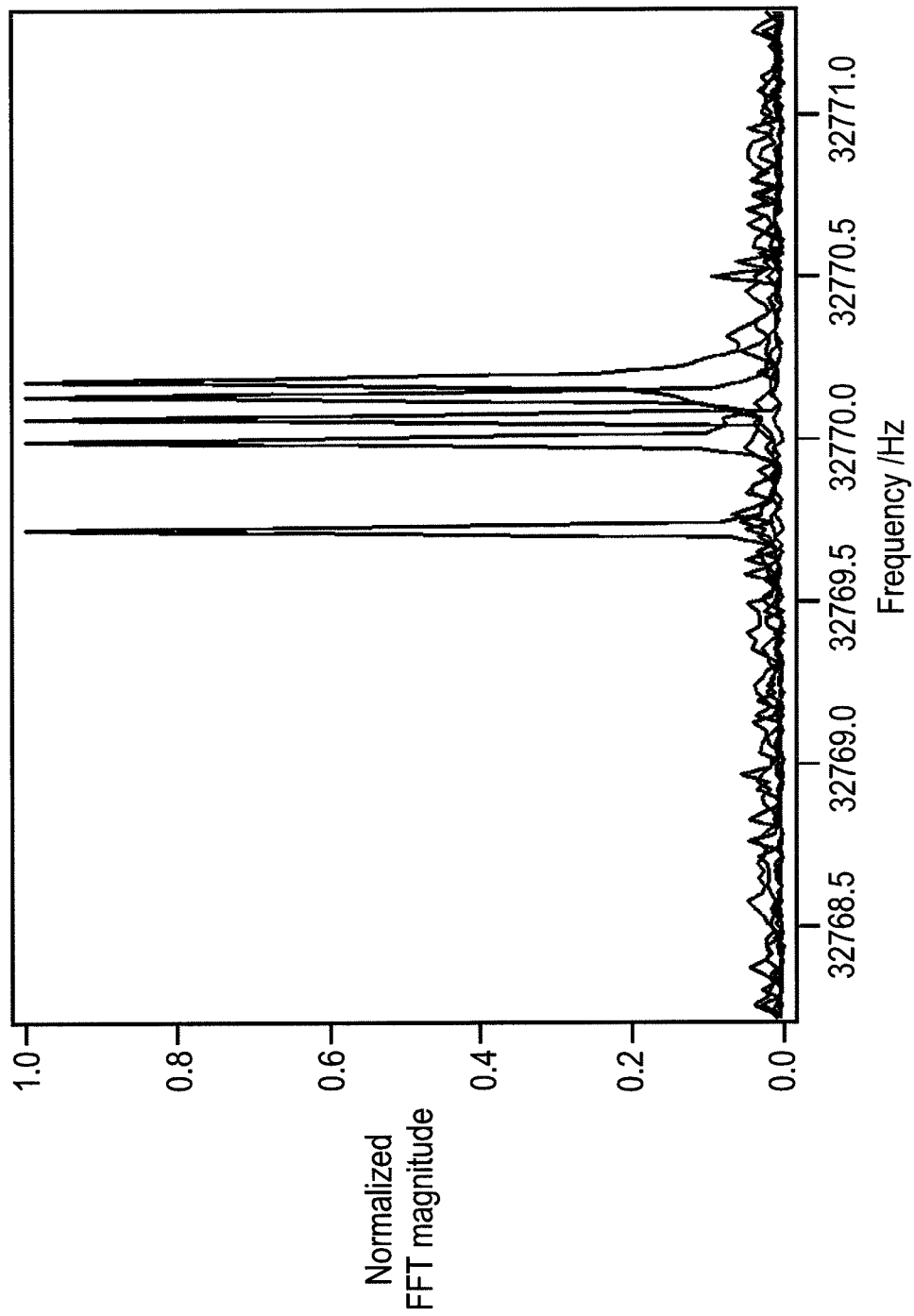
FIG. 2 shows exemplary normalized power spectra of the signal measured on five different watches of the same model and manufacturer.

FIG. 2 shows exemplary normalized power spectra of the signal measured on five different watches of the same model and manufacturer in accordance with embodiments of the invention. As shown in FIG. 2, it is apparent that each of the spectra displayed has a prominent peak around 37,770 Hz, but also that each of the peaks has a slightly different frequency.

In accordance with embodiments of the invention, the prominent peak around approximately 37,770 Hz can be used for a generic authentication test of a watch, based on the fact that all of the genuine watches of the particular model and manufacturer of watch being tested display a peak in the range of approximately 32,769.5-32,770.5 Hz. In accordance with embodiments of the invention, the same approach may be used for all the watches from a given class (e.g., model, manufacturer, type, etc.).

In accordance with embodiments of the invention, the slightly different frequency of each of the peaks may be used for authentication of the individual watch, based on the fact that a given individual watch is expected to have a peak at a specific frequency. Hence, a counterfeit with the same serial number having a peak at a different frequency would be immediately identified as such, and disqualified as an authentic item.

In embodiments of the invention, the position of the peak may be conveniently defined by the center frequency, the peak frequency, and/or the weighted frequency. Additionally, the position of the peak may be conveniently defined using other methods known to the skilled person, such as, for example, by least square fitting of the appropriate function (Lorentzian, Gaussian, etc.) to the data.

In the example given, the peak in the frequency domain is quite sharp, and the signal-to-noise ratio quite high. Both of these features have a favorable impact on the precision with which the position of the peak can be located (down to $1/100$ Hz or better). This, in turn has a favorable impact on the discriminating power of the measurement.

The measured resonant frequency from the quartz in the watch is thus compared with a reference resonant frequency for the watch. If the measured resonant frequency from the quartz is the same or to within a predefined tolerance of the reference resonant frequency then the device is deemed to be authentic. The reference data may have been created at an earlier point in time by measuring vibrations from a genuine watch and storing characteristics of the measured vibrations as a reference, for example in a database. The reference data may be stored against a product identifier, such as a serial number of the watch.

Optionally, another component frequency or frequencies of the vibrations from or of the device aside from the resonant frequency of the quartz resonator may be measured and compared with a reference frequency or frequencies for the device for authenticating the device. Less prominent peaks or subsidiary component frequencies in the spectrum may be compared.

Additional frequencies in the spectrum of the measured acoustic signal may be taken into account, which originate from parts of the device other than the quartz itself. In the case of a watch, these may include the vibrations generated by the motor driving the hands, the ticking noise emitted when the hands move, and other operations related to the functioning of the watch. The signal may be pre-processed before comparing the measured vibrations with reference data. For example, the signal may be pre-processed so as to suppress a louder sound associated with movement of hands of the watch and to enhance a faint noise remaining after the movement is complete. We refer to this as the quiet zone spectrum, as the main contribution comes from the comparatively long intervals of time when the hands are not moving, in-between the comparatively short time intervals when the hands are moving. Increasing the amount of information which is compared increases the strength of the authentication test.

Figure 3:
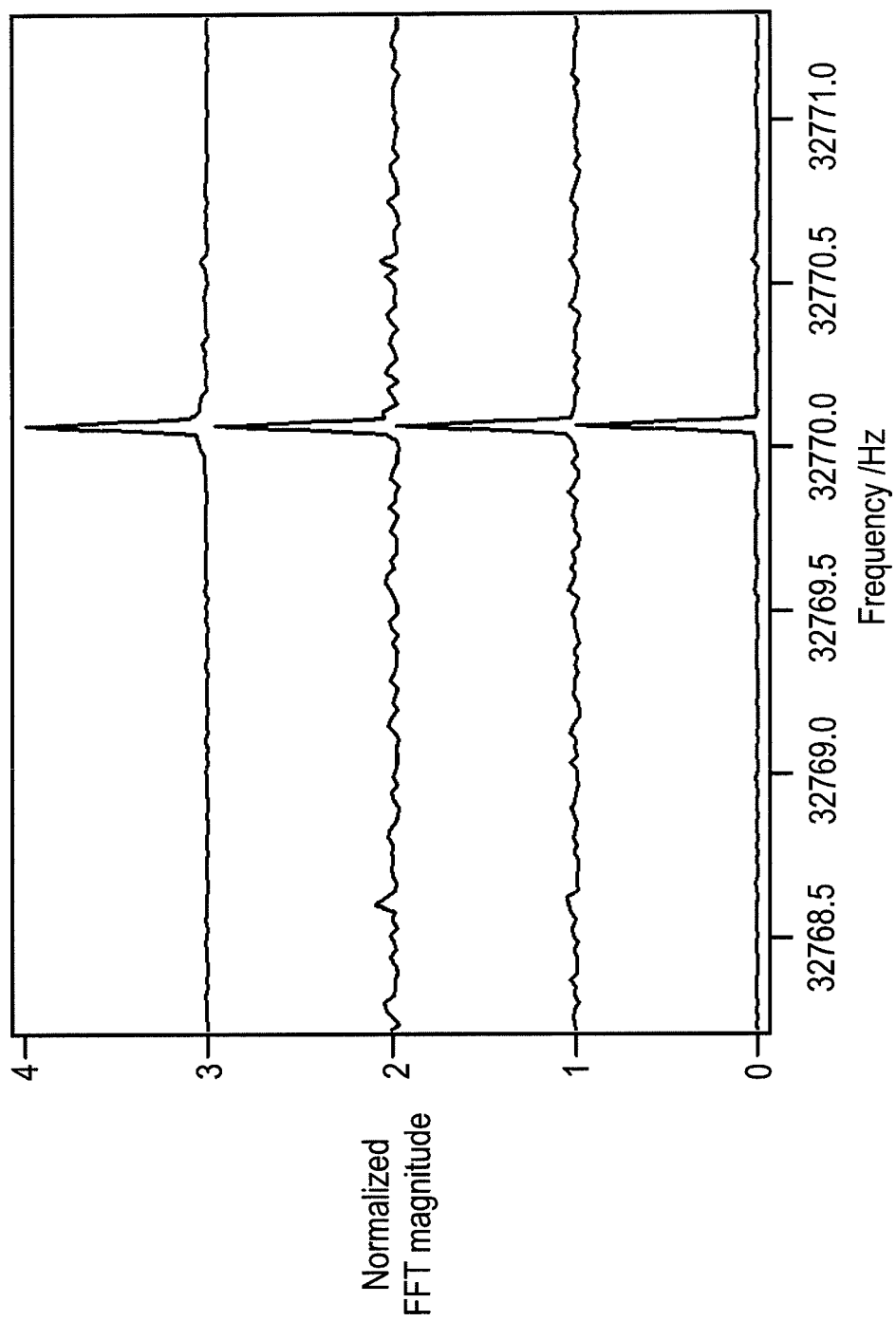
FIG. 3 shows exemplary normalized power spectra of the signal measured on the same watch taken at different times, with the spectra vertically offset vertically for clarity.

FIG. 3 shows exemplary normalized power spectra of the signal measured on the same watch at different times in accordance with embodiments of the invention. As shown in FIG. 3, the spectra are vertically offset vertically for clarity. As shown with the repeated measurements of the same watch in FIG. 3, the peak position is also quite stable and can be reproducibly measured. The frequency peak is consistently and reliably found at the same position in all measurements.

Figure 4:
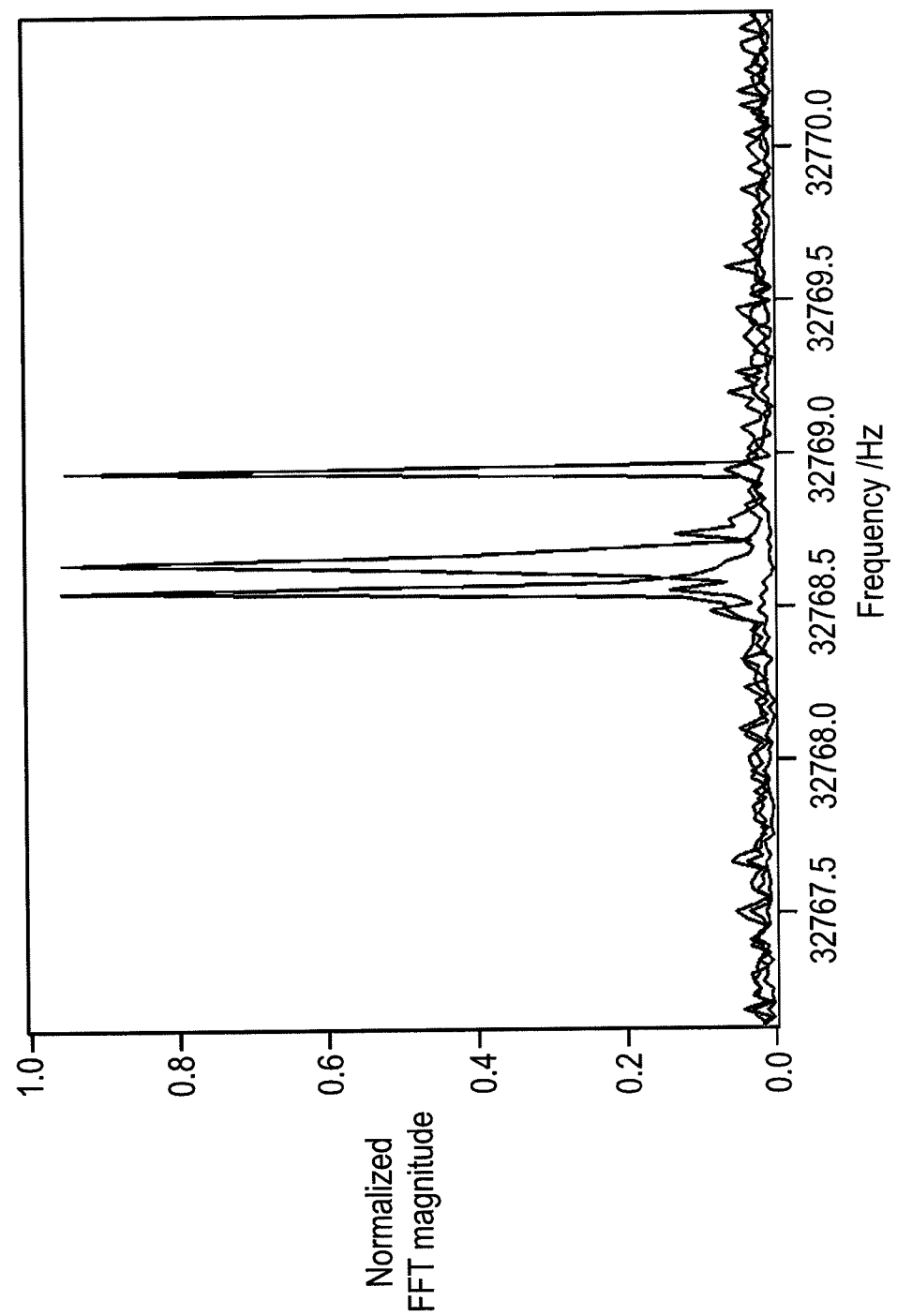
FIG. 4 shows exemplary normalized power spectra of the signal measured on three mobile phones of the same model and manufacturer.
Figure 5:
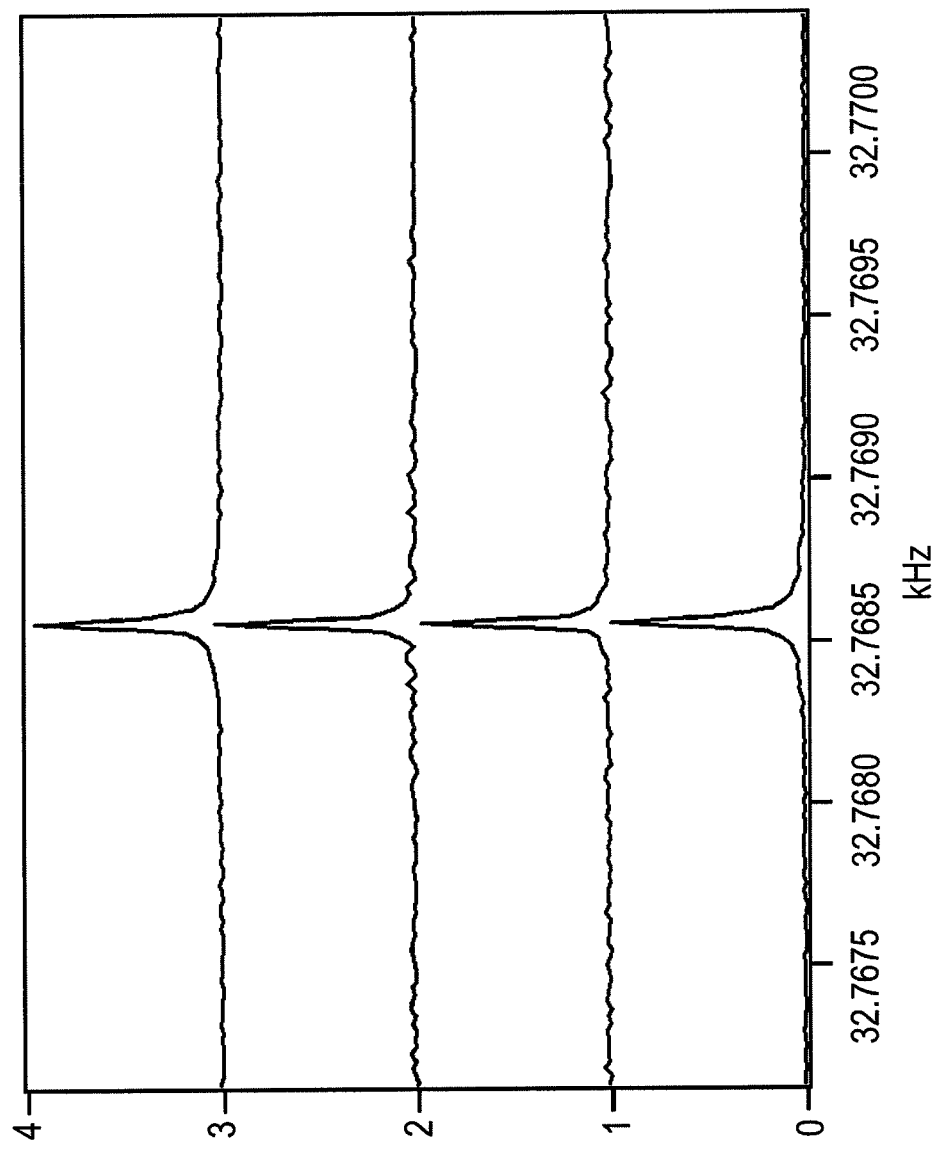
FIG. 5 shows exemplary normalized power spectra of the signal measured on the same mobile phone taken at different times.

A mobile device (e.g., a mobile phone) may utilize the same identification/authentication approach. As shown in FIGS. 4 and 5, a number of mobile phones of the same model and manufacturer were analyzed, with similar results to the watches, discussed above.

FIG. 4 shows exemplary normalized power spectra of the signal measured on three mobile phones from of the same model and manufacturer. As shown in FIG. 4, it is apparent that each of the spectra displayed has a prominent peak around approximately 32,768.5 Hz-32,769.0 Hz, but also that each of the peaks has a slightly different frequency.

FIG. 5 shows exemplary normalized power spectra of the signal measured on the same mobile phone at different times. As shown with the repeated measurements of the same mobile phone in FIG. 5, the peak position is also quite stable and can be reproducibly measured. The frequency peak is consistently and reliably found at the same position in all measurements.

In accordance with further embodiments of the invention, a device may be tailored to emit a vibration that encodes, for example, a specified piece of information, which can be used as an identifier. In an exemplary embodiment, the frequency of a quartz resonator of a device may be modulated about its natural frequency by an electronic circuit, with a modulating signal v(t). The modulator may modulate one or more of the frequency, the amplitude and the phase of vibrations of the quartz resonator. The modulating signal may vary as a function of time. The equipment as in the previous embodiments may be used to acquire the signal $S_{out}(t)$ corresponding to the generated vibration. The modulating signal v(t) can be recovered with an appropriate signal processing, as known to the skilled person.

Figure 6:
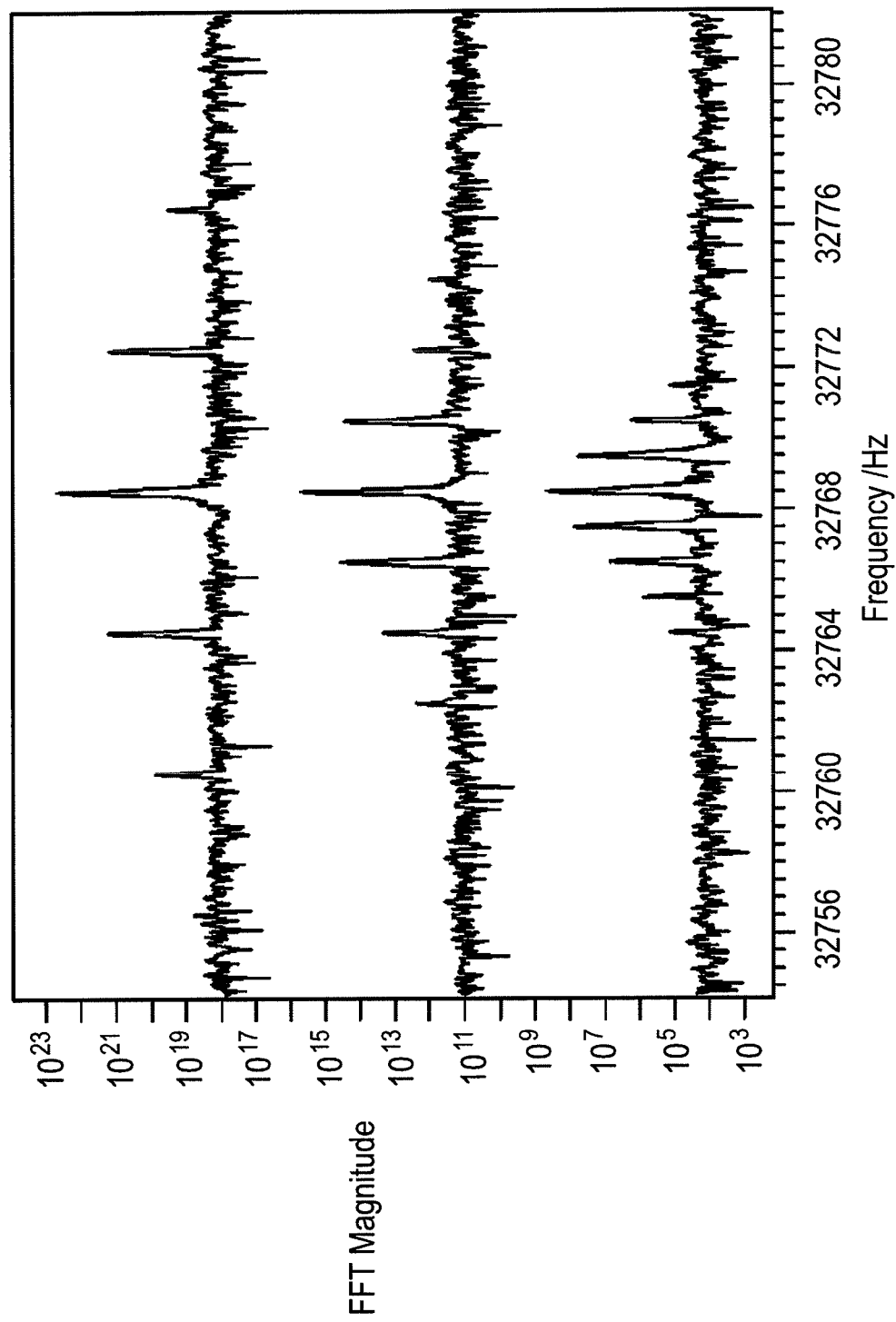
FIG. 6 shows exemplary power spectra of the signal measured on a quartz oscillator with a natural frequency of about 32 768.5 Hz modulated at 1 Hz (bottom), 2 Hz (middle), and 4 Hz (top)

FIG. 6 shows exemplary power spectra of the signal measured on a quartz oscillator with a natural frequency of about 32,768.5 Hz modulated at 1 Hz (bottom), 2 Hz (middle), and 4 Hz (top) in accordance with embodiments of the invention. As shown in FIG. 6, three results are obtained using a sinusoidal wave of 1, 2, and 4 Hz, respectively, as a modulating signal v(t), and taking the Fourier transform of the signal $S_{out}(t)$. In a non-limiting example, the three spectra can be defined to encode, respectively, the numbers 1, 2, and 4.

Figure 7:
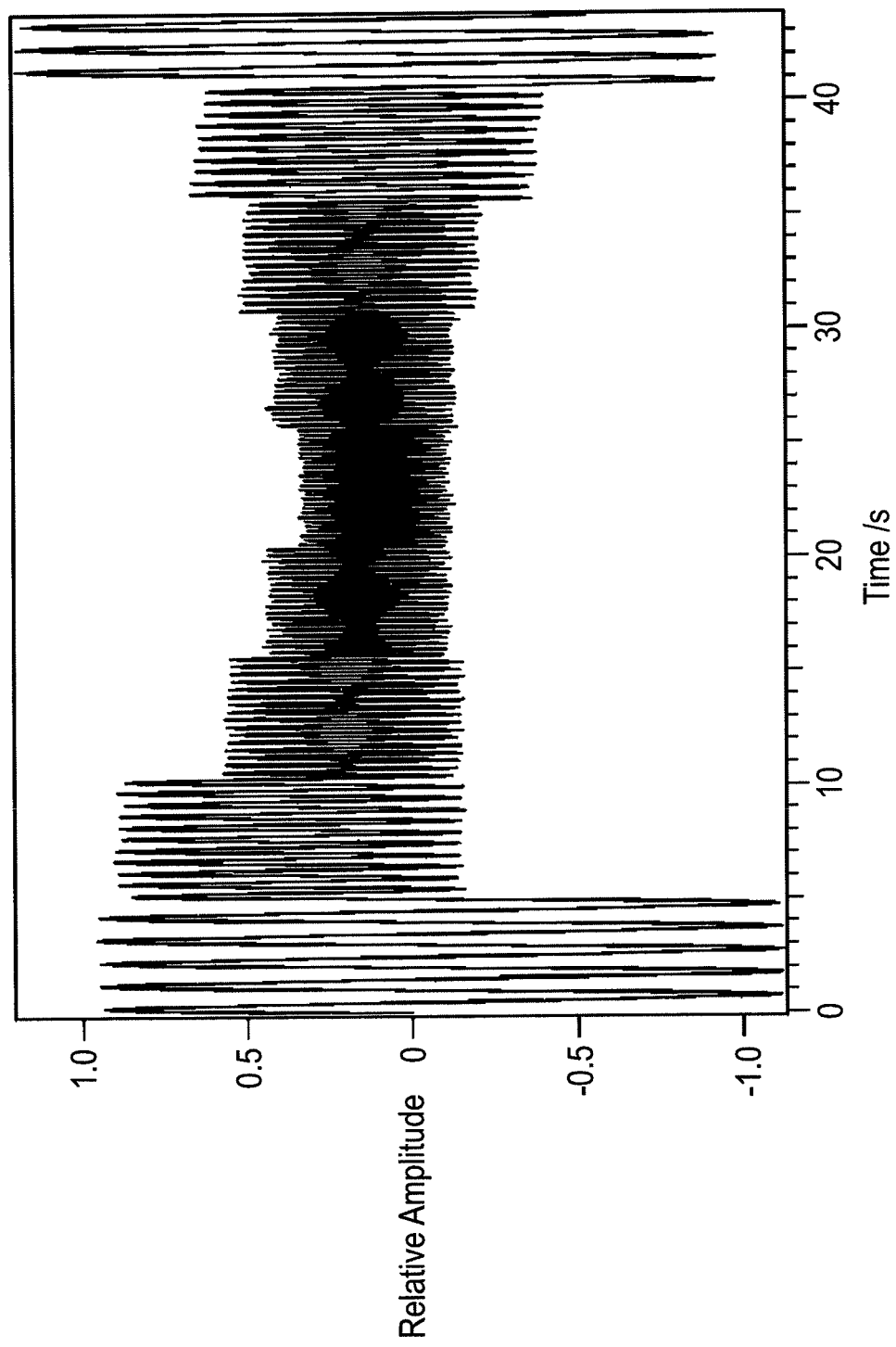
FIG. 7 shows an exemplary demodulated signal of the same quartz oscillator as in FIG. 6, wherein the oscillator is modulated, in successive 5 s intervals, respectively at 1 Hz, 2 Hz, 3 Hz, 4 Hz, 5 Hz, 4 Hz, 3 Hz, 2 Hz, 1 Hz.

FIG. 7 shows an exemplary demodulated signal of the same quartz oscillator as in FIG. 6, wherein the oscillator is modulated, in successive 5 s intervals, respectively at 1 Hz, 2 Hz, 3 Hz, 4 Hz, 5 Hz, 4 Hz, 3 Hz, 2 Hz, 1 Hz in accordance with embodiments of the invention. FIG. 7 shows the result obtained using a sinusoidal wave of 1, 2, 3, 4, 5, 4, 3, 2, and 1 Hz, respectively, as a modulating signal v(t) during successive time intervals of approximately 5 s length. The signal $S_{out}(t)$ is then numerically demodulated multiplying it by a sinusoidal wave at the natural frequency of the oscillator (32,768.5178 Hz). In a non-limiting example, the signal can be defined to encode the sequence 123454321.

The sequence may be linked to another identifier present on the object (e.g. its serial number).

In accordance with further embodiments of the present invention, a second element or transducer, for example an electroacoustic transducer such as a piezoelectric transducer for example a quartz resonator, capable of generating acoustic vibrations is added to the device. Specific information may be encoded in the vibration generated by this second element. In embodiments, the second element may be, for example, a second quartz.

Figure 8:
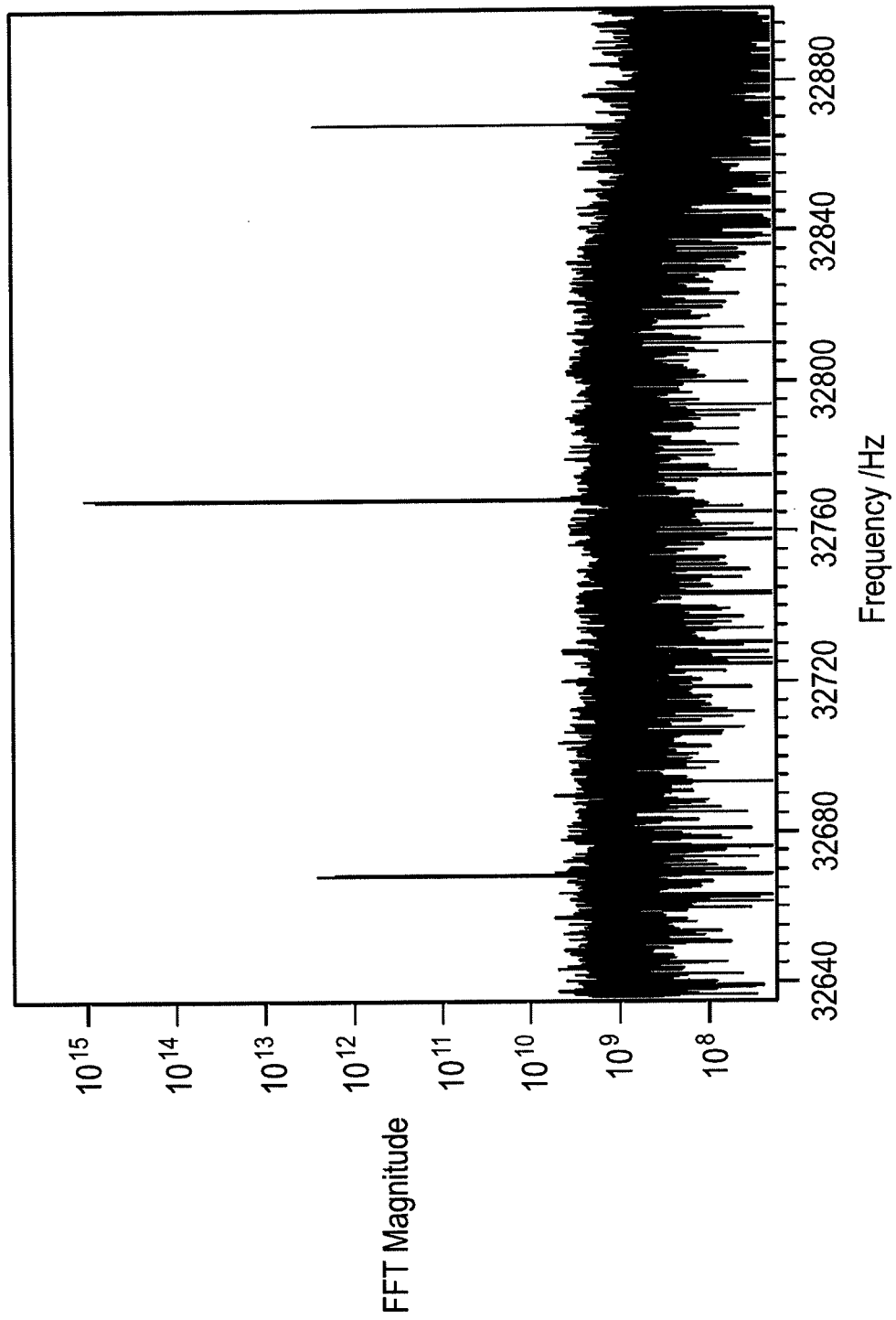
FIG. 8 shows exemplary power spectra of the signal measured on a device incorporating a quartz oscillator with a natural frequency $f_0$ of about 32 768.39 Hz and a piezoelectric transducer which is excited with two sinusoidal waves of frequency $f_0-100$ Hz and $f_0+100$ Hz, respectively.

FIG. 8 shows exemplary spectra of a device incorporating a quartz oscillator with a natural frequency $f_0$ of about 32,768.39 Hz and a piezoelectric transducer that is excited with two sinusoidal waves of frequency $f_0-100$ Hz and $f_0+100$ Hz, respectively, in accordance with embodiments of the invention. FIG. 8 shows an exemplary and non-limiting result obtained using as an excitation signal u(t) of the second element two sinusoidal waves of frequency $f_0-100$ Hz and $f_0+100$ Hz, respectively, and taking the Fourier transform of the signal $S_{out}(t)$. In a non-limiting example, the spectra can be defined to encode, respectively, the numbers −100 and 100. The examples given here should not be taken as limiting. Other signals can be used as modulation and/or excitation, and the invention contemplates other encoding and decoding schemes.

In embodiments, a timepiece may include a first electroacoustic transducer and a second electroacoustic transducer. The first electroacoustic transducer may be a quartz element dedicated to time-keeping purposes, and the second electroacoustic transducer may be dedicated to identification or authentication purposes. In embodiments, the second electro-acoustic transducer may be designed to broadcast a predetermined message or an arbitrary message. In embodiments, the second transducer is also a quartz oscillator, and it is not used for time-keeping purposes.

In embodiments, in a timepiece having two electroacoustic transducers, the first transducer may be linked to the second transducer. With an exemplary and non-limiting embodiment, a first quartz element may be correlated to the second quartz element (e.g., their frequencies may be offset by a prescribed value). With a further exemplary and non-limiting embodiment, the second quartz element may be designed based on the first quartz element.

In further embodiments, a timepiece may include more than two (e.g., three) electro-acoustic transducers, wherein the first is a quartz element dedicated to time-keeping purposes, and the remaining (e.g., two) are dedicated to identification or authentication purposes. In embodiments, the second transducer may be designed to broadcast a predetermined message or an arbitrary message.

The quartz for the devices may be manufactured to produce a range of variability (e.g., narrow variability) between different quartz crystals so that the resulting peak frequencies of the quartz crystals are close (e.g., within range of variability) but not exactly the same (e.g., unique). In accordance with aspects of the invention, quartz may be manufactured to produce a range of variability which provides for both the "general" make and/or model level of identification, and the "specific" individual authentication.

In further embodiments of the invention, a timepiece may include a single quartz element dedicated to both time-keeping purposes and identification purposes. For example the single quartz may be designed to emit a first frequency to generate the pulse (for timekeeping), and, e.g., simultaneously emitting a second frequency used to encode the authentication message.

In additional embodiments, a timepiece may include a single quartz element dedicated to time-keeping purposes and a transducer dedicated to identification purposes. In embodiments, the transducer may be a piezo-electric transducer.

It has been observed by the inventors of the embodiments of the present invention that the reliability and degree of precision of the embodiments of the invention are such that it is possible to even identify differences between the timepieces of an identical model. Indeed, because of manufacturing tolerances, even two timepieces of an identical model differ from each other. When applying the principles underlined in the present invention to different timepieces from the same series and the same manufacturer, it can be seen that the corresponding acoustic measurements are different and the extracted relevant respective pieces of frequency information, which characterize the fingerprint of the respective timepiece, are different. Hence, an identifier (e.g., a unique identifier) can be defined for a timepiece without having to open the timepiece.

As shown in FIGS. 2 and 4, different models of products (e.g., timepieces and mobile phones, respectively) will have different characteristic time-frequency representations. Consequently, by comparing the time-frequency representation of a timepiece to be authenticated with a reference time-frequency representation, which is expected for this particular timepiece model, authenticity information on the timepiece to be authenticated can be derived. Hence, it can be derived whether a timepiece to be authenticated is an authentic product or a counterfeit product. Additionally, as shown in FIG. 2, the same model of watch may exhibit different time-frequency representations, such that the time-frequency representation may be used as a unique identifier for a particular timepiece.

The above-described measurements of a particular timepiece should not change over time (i.e., remain stable). For example, as long as components of the watch are not touched or manipulated, the above-described measurements of a particular timepiece will not change. Of course, with maintenance of the timepiece (e.g., when the timepiece is opened), the above-described measurements may be affected. As such, when timepiece maintenance is performed (e.g., when the timepiece is opened), the timepiece should be recertified (e.g., the peak frequency of the quartz of the timepiece should be recaptured, and the results of the one or more the above-described measurements should be identified and stored). In embodiments, once the timepiece is recertified, the results of the one or more the above-described measurements may also be linked with the timepiece identifier (e.g., the timepiece serial number), for example, in a database.

While the above-described measurements a timepiece should not change over time, the embodiments of the invention contemplate that some of the above-described measurements of respective timepiece may change (e.g., slightly) over time. Thus, in accordance with embodiments of the invention, a threshold for determining a positive authentication of a timepiece may be configured (e.g., lowered) in dependence upon an age of the timepiece. That is, in embodiments, an older timepiece may be subjected to a lower threshold for a positive authentication via comparison with stored time measurements, frequency measurements, and/or magnitude measurements (or stored identifiers based upon the measurements). In embodiments, the timepiece may be recertified on a regular basis (e.g., yearly) to account for the evolution (e.g., any property changes) of the timepiece over time.

With further contemplated embodiments, the analysis of a timepiece may be in two levels (e.g., a less intense first level and a more intense second level). For example, with a first level of analysis (e.g., an initial assessment), the timepiece may be identified by a make and model (e.g., using a peak within a range of frequencies), to determine if the timepiece is authentic (i.e., verified as a particular make and model). With this first level of analysis, an assessment may determine, for example, that the timepiece is in fact a particular make and/or model. A second level of analysis may include a deeper analysis of the emitted sounds, to identify a unique "finger print" for the timepiece (e.g., using a specific peak or a peak within a range of frequencies). This unique "finger print" may be stored in a database and/or compared with previously stored finger prints to positively identify the timepiece. In embodiments, either or both of the first and second levels of analysis may be done with a new timepiece, or with used timepieces that have not been previously analyzed.

Figure 9:
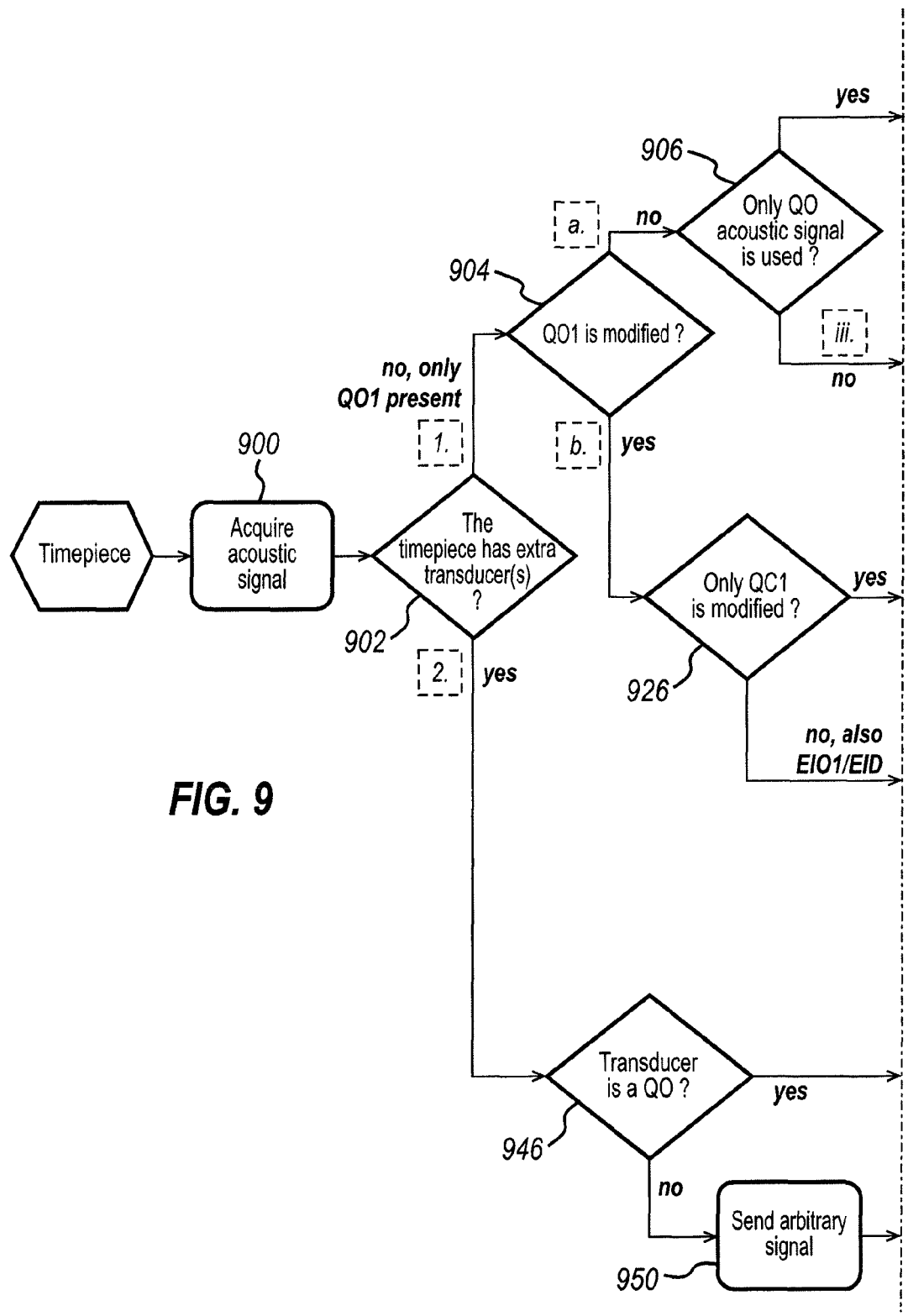
FIG. 9 is a flow diagram illustrating analyses of embodiments of different timepieces.

FIG. 9 is a flow diagram illustrating analyses of embodiments of different timepieces. An acoustic signal is acquired from the timepiece at step 900. The timepiece comprises a quartz based electronic oscillator Q01 comprising a quartz crystal QC1 (i.e. the piezo-electric mechanical resonator whose resonant frequency serves as the timebase) and electronic circuitry EI01 used to drive the quartz crystal and generate an oscillating electronic signal which serves as the time base for the watch. If the timepiece does not have any additional transducers then it is determined at step 904 if the quartz based electronic oscillator Q01 has been modified, for example if there is there a modulator which modules the acoustic signal from the circuit. If the quartz based electronic oscillator Q01 has not been modified then at step 906 it is possible to selectively analyse measured vibrations which result from the vibration of the quartz crystal Q01 or it possible to analyse measured vibrations which result from the vibration of the quartz crystal Q01 and which result from the vibration of other components of the timepiece, such as from vibrations generated by the motor driving the watch hands or the ticking noise emitted when the hands move.

If only measured vibrations which result from the vibration of the quartz crystal Q01 are to be analysed, then at step 908 a Fourier transform of the measured signal is taken. Then, at step 910, the frequency of the main peak in the spectrum is used for authentication purposes. The frequency of the main peak in the spectrum is determined and stored or compared with a reference frequency at step 912 for authentication purposes. Optionally, characteristics of less prominent or subsidiary peaks in the spectrum can be used for authentication purposes. Characteristics of less prominent peaks, such as their frequency, can be stored or compared with reference characteristics at step 914. Increasing the amount of information which is compared advantageously increases the strength of the test.

At step 906 it is possible to analyse measured vibrations which result from the vibration of the quartz crystal Q01 and which result from the vibration of other components of the timepiece, such as from vibrations generated by the motor driving the watch hands or the ticking noise emitted when the hands move. At step 916, it is possible to analyse the frequency of the measured vibrations, in which case at step 918 a Fourier transform of the measured signal is taken to transform the signal into a frequency domain. Then, at step 920, the frequency of the main peak in the spectrum is determined and stored or compared with a reference frequency for authentication purposes and/or characteristics of less prominent peaks or subsidiary peaks in the spectrum are stored or compared with reference characteristics for authentication purposes.

At step 916, in is additionally possible to carry out other authentication analyses on the signal, for example to carry out another transform on the signal at step 922 such as a time-frequency domain transform such as a wavelet transform. A spectrogram may be created for analysis. Characteristics of the transform are stored or compared with reference data for analysis at step 924.

Returning to step 904, if the quartz based electronic oscillator Q01 is modified then it, is possible that the vibrations resulting from the quartz crystal are modified at option 926, in which case the same procedure as branch 1a and corresponding options as outlined from box 906 are followed, as indicated in box 928.

It is possible that the electronic circuitry used to drive the quartz crystal and generate an oscillating electronic signal which serves as the timebase for the watch EI01 is modified with a modulator and/or that the electronic/electro-mechanical circuitry used to drive and operate the watch EID1 is modified with a modulator i.e. the components which for example count the oscillations of the reference, advance the hands of the timepiece if the timepiece is an analog timepiece or which drive the display of the timepiece if the timepiece is a digital timepiece are modified. A modulator may be provided to modulate the amplitude or the frequency of vibrations from one or more components, as indicated at box 930. Other modulation schemes are also possible, as indicated in box 944. It is possible that the frequency of the vibrations from one or more of the components is analysed, as indicated in box 932, in which case a Fourier transform of the measured signal may be taken, as indicated in box 934. Then, at step 936, data from the Fourier transform is stored or compared with a reference frequency for authentication purposes.

At step 932, in is possible to carry out other authentication analyses on the signal, for example to demodulate the signal into a time domain at step 938. Demodulation can be done by nonlinear mixing (analog/digital) with a signal at the carrier frequency, in a similar way to that known for AM/FM radio transmission. The decoded message can then be compared with the expected message at step 940.

A further authentication analysis is indicated at step 942, wherein a time frequency information is carried out on the signal. The time-frequency domain transform may include, for example, wavelet, spectrogram or a short-term Fourier transform.

If the timepiece has one or more extra transducers, as indicated at step 902, then it is possible that the extra transducer is a quartz based electronic oscillator, as indicated in step 946. In this case, as indicated at step 948, the same procedures as indicated at branch 1 may be followed. If the extra transducer not a quartz oscillator then it may emit an arbitrary signal for detection as indicated in box 950. Any arbitrary signal may be sent that is supported by the transducer and the detection system for example spread spectrum techniques such as frequency hopping, and frequency shift keying. The arbitrary signal may be decoded and compared with an expected message at step 952.

The authentication methods described herein may be used on different devices. The device may be a timepiece. In one device, a quartz is inherently present inside the object to perform a specific function, such as keeping time. The quartz and/or the electronic circuitry driving it may not been modified (i.e. it is taken as is). The frequency of the main peak in the spectrum of the acoustic signal generated by the quartz may be used for authentication purposes. Optionally, less prominent peaks in the spectrum may be used for authentication purposes in order to increase the amount of discriminating information. Optionally, other acoustic signals generated by the object may be analyzed for authentication purposes, in order to increase the amount of discriminating information (e.g. the vibrations generated by the motor driving the watch hands, the ticking noise emitted when the hands move, etc.).

In another device, the quartz and/or the electronic circuitry driving it may have been modified so as to encode additional information in the acoustic signal it generates. The main frequency of the quartz may be modulated (e.g. amplitude modulation or frequency modulation) in order to generate a set of additional peaks in the frequency spectrum and the frequency of these peaks may be used for authentication purposes (e.g. by linking it to a serial number). The main frequency of the quartz may be modulated (e.g. amplitude modulation or frequency modulation) with a time-variable signal (as in radio transmission), and the generated acoustic signal can be demodulated to recover the modulating signal. Other schemes are also possible.

One or more quartz or other transducer capable of generating an acoustic signal may be deliberately added to the object for the main purpose of authentication. The object may or may not already contain an inherent quartz used for other purposes (for example timekeeping); if it does, the signal of the quartz or other transducer may be deliberately linked to the inherent quartz. The quartz or other transducer may not been modified (i.e. it is taken as is). The frequency of the main peak in the spectrum of the acoustic signal generated by the quartz or transducer may be used for authentication purposes. Optionally, less prominent peaks in the spectrum may be used for authentication purposes in order to increase the amount of discriminating information. Optionally, other acoustic signals generated by the object may be analyzed for authentication purposes, in order to increase the amount of discriminating information (e.g. the vibrations generated by the motor driving a watch hands, the ticking noise emitted when the hands move, etc.). The characteristics of the quartz or other transducer may be chosen more freely, since it may not have to perform additional functions (e.g. time-keeping). The quartz or other transducer may have been engineered for the purpose of sending out an acoustic signal. In this case, the signal may be arbitrarily long and complex, for example to encode a product identifier such as a serial number, or a message.

While described above with regard to watches and mobile devices, the present invention may be applied to other electrical equipment or devices.

System Environment

As will be appreciated by one skilled in the art, the present invention may be embodied as a timepiece, a system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
  an electrical connection having one or more wires,
  a portable computer diskette,
  a hard disk,
  a random access memory (RAM),
  a read-only memory (ROM),
  an erasable programmable read-only memory (EPROM or Flash memory),
  an optical fiber,
  a portable compact disc read-only memory (CDROM),
  an optical storage device, a transmission media such as those supporting the Internet or an intranet,
a magnetic storage device
a usb key,
a certificate,
a perforated card, and/or
a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 10:
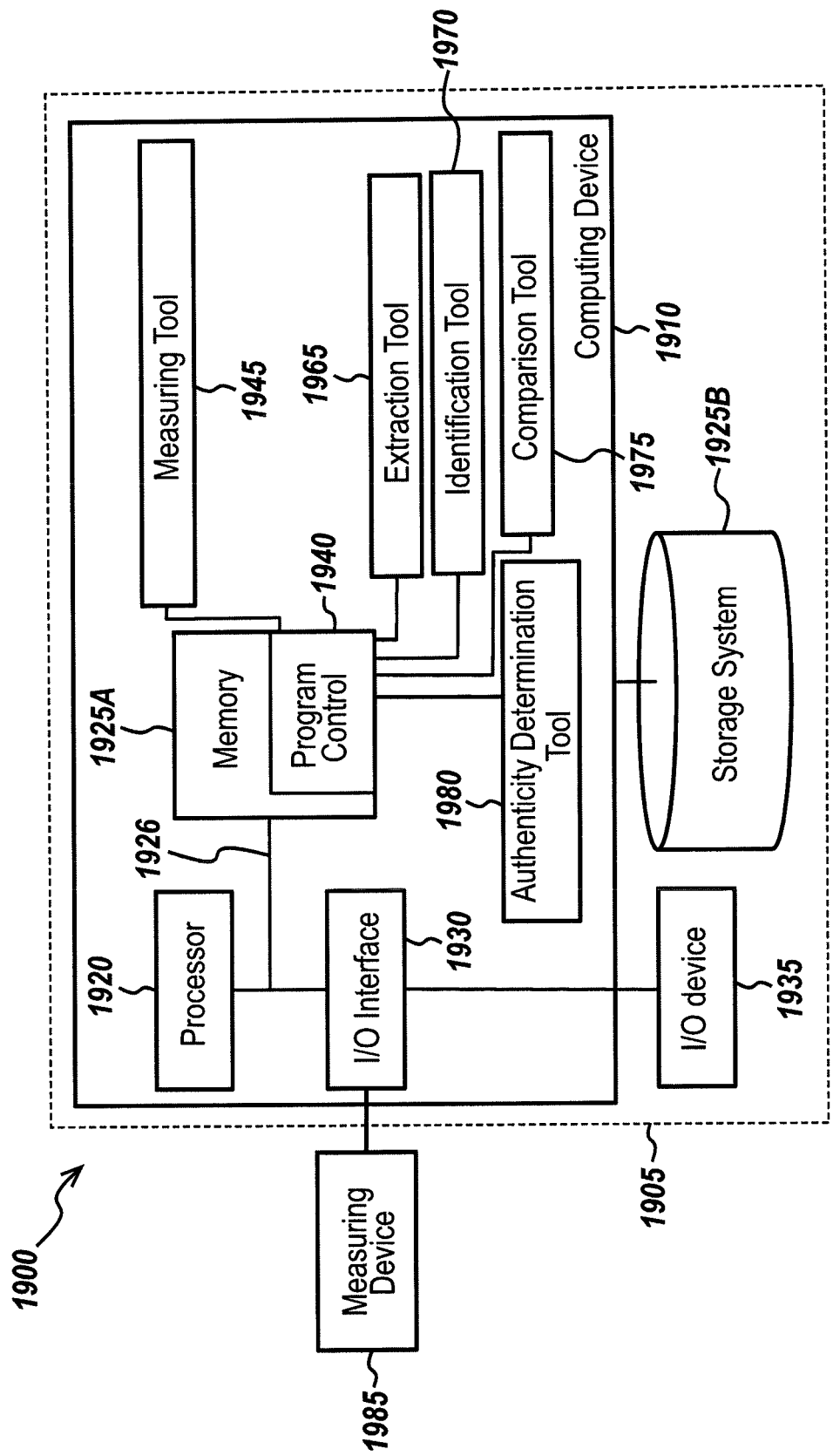
FIG. 10 shows an illustrative environment for managing the processes in accordance with embodiments of the invention.

FIG. 10 shows an illustrative environment 1900 for managing the processes in accordance with the invention. To this extent, the environment 1900 includes a server or other computing system 1905 that can perform the processes described herein. In particular, the server 1905 includes a computing device 1910. The computing device 1910 can be resident on a network infrastructure or computing device of a third party service provider (any of which is generally represented in FIG. 10).

In embodiments, the computing device 1910 includes a measuring tool 1945, an extraction tool 1965, an identification tool 1970, a comparison tool 1975, and an authenticity determination tool 1980, which are operable to measure one or more detected sounds or vibrations, extract from an electrical signal or from a representation of said electrical signal in a time, frequency or time-frequency domain at least one of: magnitude information on a magnitude of one of a plurality of acoustic events or characteristic parts of the detected signal, time information on said one of said plurality of acoustic events, and frequency information on a frequency of said one of said plurality of acoustic events, create an identifier based on the extracted information, compare the extracted information with stored information, and determine an authenticity, e.g., the processes described herein. The measuring tool 1945, the extraction tool 1965, the identification tool 1970, the comparison tool 1975, and the authenticity determination tool 1980 can be implemented as one or more program code in the program control 1940 stored in memory 1925A as separate or combined modules.

The computing device 1910 also includes a processor 1920, memory 1925A, an I/O interface 1930, and a bus 1926. The memory 1925A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 1910 is in communication with the external I/O device/resource 1935 and the storage system 1925B. For example, the I/O device 1935 can comprise any device that enables an individual to interact with the computing device 1910 or any device that enables the computing device 1910 to communicate with one or more other computing devices using any type of communications link. The external I/O device/resource 1935 may be for example, a handheld device, PDA, handset, keyboard, smartphone, etc. Additionally, in accordance with aspects of the invention, the environment 1900 includes a measuring device 1985 for measuring sound vibrations (e.g., sonic emissions) from one or more timepieces.

In general, the processor 1920 executes computer program code (e.g., program control 1940), which can be stored in the memory 1925A and/or storage system 1925B. Moreover, in accordance with aspects of the invention, the program control 1940 having program code controls the measuring tool 1945, the extraction tool 1965, the identification tool 1970, the comparison tool 1975, and the authenticity determination tool 1980. While executing the computer program code, the processor 1920 can read and/or write data to/from memory 1925A, storage system 1925B, and/or I/O interface 1930. The program code executes the processes of the invention. The bus 1926 provides a communications link between each of the components in the computing device 1910.

The computing device 1910 can comprise any general purpose computing article of manufacture capable of executing computer program code installed thereon (e.g., a personal computer, server, etc.). However, it is understood that the computing device 1910 is only representative of various possible equivalent-computing devices that may perform the processes described herein. To this extent, in embodiments, the functionality provided by the computing device 1910 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 1905 is only illustrative of various types of computer infrastructures for implementing the invention. For example, in embodiments, the server 1905 comprises two or more computing devices (e.g., a server cluster) that communicate over any type of communications link, such as a network, a shared memory, or the like, to perform the process described herein. Further, while performing the processes described herein, one or more computing devices on the server 1905 can communicate with one or more other computing devices external to the server 1905 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagrams

Figure 11:
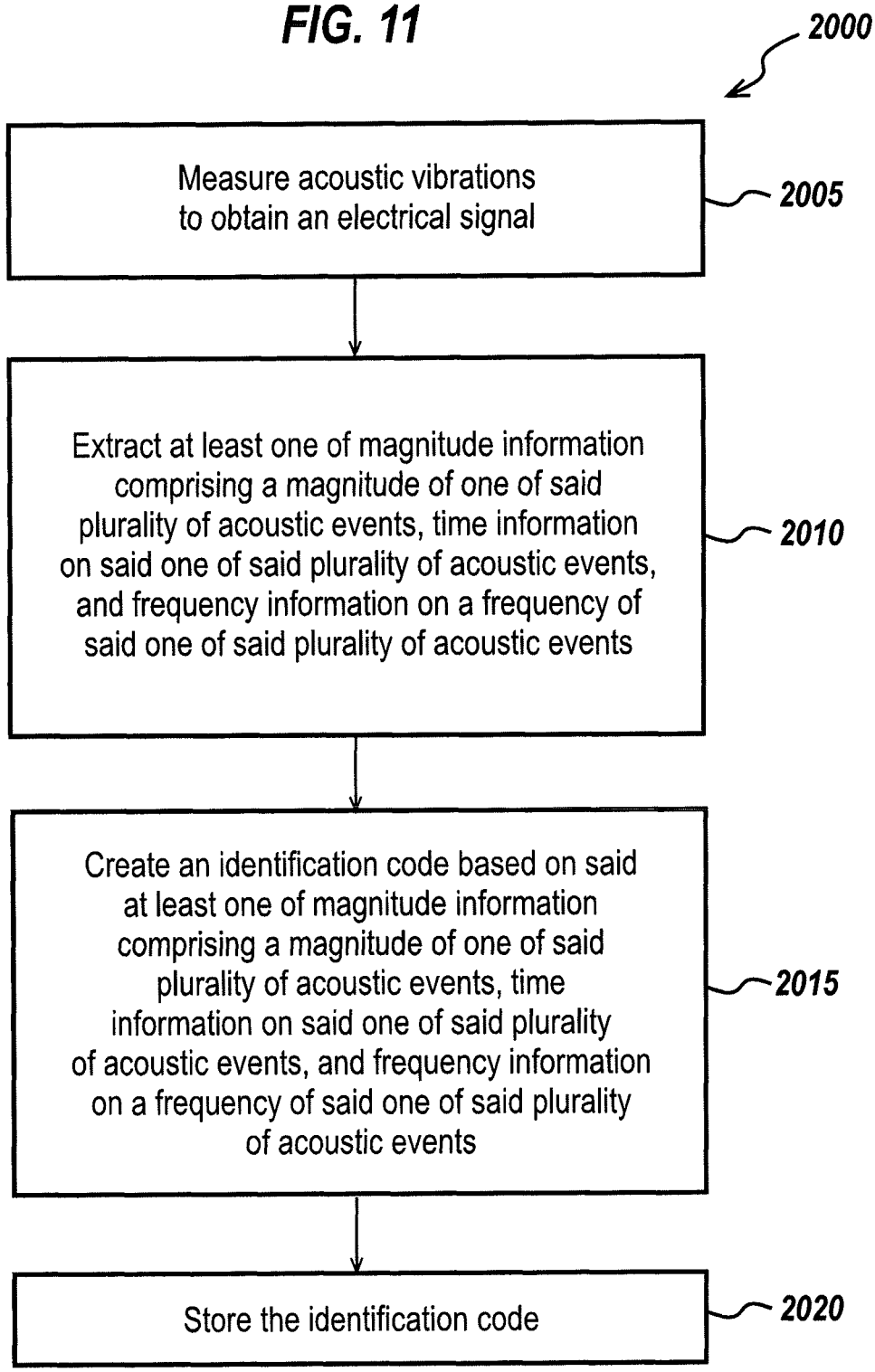
FIGS. 11 and 12 show exemplary flows for performing aspects of embodiments of the present invention.
Figure 12:
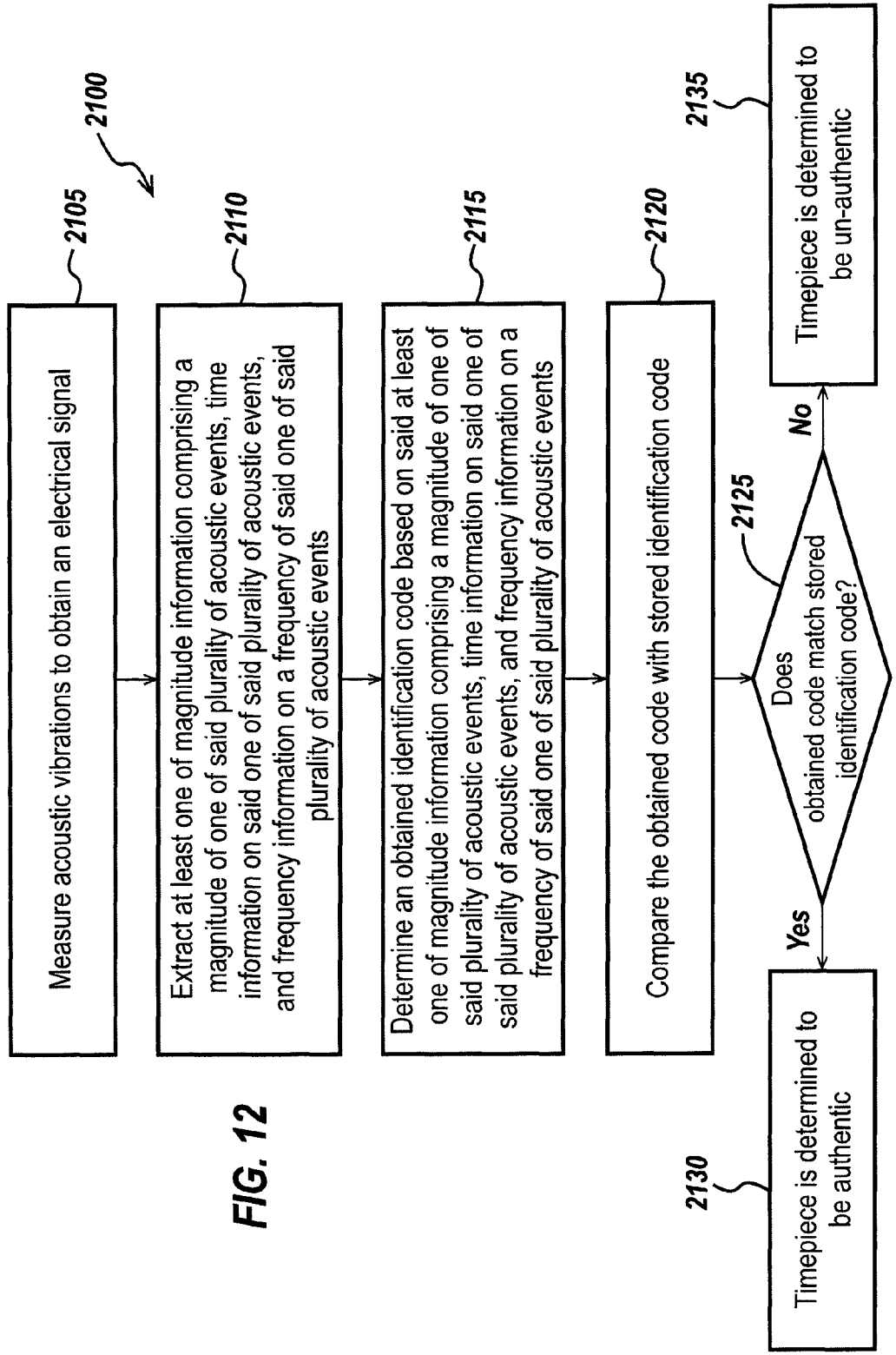

FIGS. 11 and 12 show exemplary flows for performing aspects of the present invention. The steps of FIGS. 11 and 12 may be implemented in the environment of FIG. 10, for example. The flow diagrams may equally represent high-level block diagrams of embodiments of the invention. The flowcharts and/or block diagrams in FIGS. 11 and 12 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s), (and/or it may represent a piece of hardware). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 10. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 11 illustrates an exemplary flow 2000 for creating and storing an identification code for a timepiece. At step 2005, the measuring tool measures acoustic vibrations to obtain an electrical signal. As shown in FIG. 11, at step 2010, the extraction tool extracts from said electrical signal or from a representation of said electrical signal in a time, frequency or time-frequency domain at least one of: magnitude information on a magnitude of one of said plurality of acoustic events, time information on said one of said plurality of acoustic events, and frequency information on a frequency of said one of said plurality of acoustic events. At step 2015, the identification tool creates an identification code based on at least one of the magnitude information, the time information, and the frequency information. At step 2020, the identification tool stores the identification code in a storage system, e.g., a database.

FIG. 12 illustrates an exemplary flow 2100 for authentication and/or identification of a timepiece. As shown in FIG. 12, at step 2105, the measuring tool measures acoustic vibrations to obtain an electrical signal. At step 2110, the extraction tool extracts from said electrical signal or from a representation of said electrical signal in a time, frequency or time-frequency domain at least one of: magnitude information on a magnitude of one of said plurality of acoustic events, time information on said one of said plurality of acoustic events, and frequency information on a frequency of said one of said plurality of acoustic events. At step 2115, the identification tool creates an obtained identification code based at least one of the magnitude information, the time information, and the frequency information. At step 2120, the comparison tool compares the obtained code with stored identification codes. At step 2125, the authentication determination tool determines whether the obtained code matches a stored identification code. If, at step 2125, the authentication determination tool determines that the obtained code matches a stored identification code, at step 2130, the timepiece is determined to be authentic. If, at step 2125, the authentication determination tool determines that the obtained code match does not match a stored identification code, at step 2135, the timepiece is determined to be un-authentic.

While the invention has been described with reference to specific embodiments, those skilled in the art will understand that various changes may be made and equivalents may be substituted for elements thereof without departing from the true spirit and scope of the invention. In addition, modifications may be made without departing from the essential teachings of the invention.

What is claimed is:

1. A method of authenticating a timepiece, wherein the timepiece comprises a quartz resonator for emitting a vibration, the method comprising:
   detecting vibrations from said timepiece resulting from the vibration of the quartz resonator for determining the authenticity of the timepiece;
   analyzing the detected vibrations to determine the authenticity of the timepiece,
   wherein the analyzing the detected vibrations comprises comparing the detected vibrations with reference information for the timepiece; and
   determining the authenticity of the timepiece based on the comparison.

2. The method of claim 1, wherein analyzing the detected vibrations comprises identifying one or more component frequencies of the vibrations, and comparing one or more subsidiary component frequencies of the vibrations with a reference frequency or frequencies.

3. The method according to claim 2, wherein the step of identifying one or more component frequencies of the vibrations comprises using a mathematical algorithm to identify one or more component frequencies of the vibration.

4. The method according to claim 3, wherein the mathematical algorithm comprises one of a Fourier transform, a short-time Fourier transform, a Gabor transform, a Wigner transform, and a wavelet transform.

5. The method of claim 2, further comprising identifying a resonant frequency of the quartz resonator from one or more of the component frequencies of the vibrations.

6. The method of claim 5, further comprising comparing the identified resonant frequency with a reference frequency range for the timepiece.

7. The method of claim 6, further comprising determining an authenticity of the timepiece based on the comparison.

8. The method of claim 5, further comprising comparing the identified resonant frequency with a reference resonant frequency for the timepiece.

9. The method of claim 8, further comprising determining an authenticity of the timepiece based on the comparison.

10. The method of claim 1, wherein analyzing the detected vibrations comprises identifying a resonant frequency of the quartz resonator from the detected vibrations.

11. The method of claim 1, further comprising detecting vibrations from said timepiece resulting from the movement of mechanical components of the timepiece, for example from movement of hands of the timepiece, and analyzing said vibrations for determining the authenticity of the timepiece.

12. The method of claim 1, wherein the timepiece comprises a modulator for modulating the vibration of the quartz resonator to encode a signal in the vibrations from the timepiece, the method further comprises analyzing the detected vibrations to determine the signal encoded by the modulator.

13. The method of claim 12, wherein the modulator is a frequency modulator or an amplitude modulator.

14. The method of claim 12, wherein the modulator encodes a time-varying signal, and wherein analyzing the detected vibrations comprises demodulating a signal which represents vibrations from the timepiece to determine the signal encoded by the modulator.

15. The method of claim 12, further comprising comparing the determined encoded signal with reference information for the timepiece to authenticate the timepiece.

16. The method of claim 15, further comprising determining an authenticity of the timepiece based on the comparison.

17. The method of claim 12, wherein the signal encoded by the modulator conveys an identifier for identifying the timepiece, for example a serial number of the timepiece.

18. The method of claim 1, further comprising converting the detected vibration of the timepiece into an electrical signal for analysis for determining the authenticity of the timepiece.

19. The method according to claim 18, wherein converting the detected vibration of the timepiece into an electrical signal for analysis comprises converting the detected vibration of the timepiece into an electrical signal using a transducer.

20. The method of claim 1, wherein the quartz resonator has a prong length (L) from 2 to 4 mm, a prong width (W) from 0.2 to 0.6 mm and a prong thickness (T) from 0.1 to 0.4 mm.

21. The method of claim 1, wherein the timepiece further comprises a transducer for emitting a vibration, and wherein the method comprises detecting vibrations from the timepiece resulting from the vibration of the transducer for determining the authenticity of the timepiece.

22. The method of claim 21, wherein the transducer comprises a quartz resonator.

23. The method of claim 21, further comprising identifying one or more component frequencies of the vibration from the timepiece resulting from the vibration of the transducer, and comparing one or more of the identified component frequencies with a reference frequency or reference frequencies for authenticating the timepiece.

24. The method of claim 23, wherein comparing one or more of the identified component frequencies with a reference frequency or reference frequencies comprises comparing a resonant frequency of the transducer and/or a subsidiary frequency of the vibration with a reference frequency for authenticating the timepiece.

25. The method of claim 21, wherein the timepiece comprises a modulator for modulating the vibration of the transducer to encode a signal in the vibrations of the timepiece, wherein the method further comprises analyzing the detected vibrations to determine the signal encoded by the modulator.

26. The method of claim 25, wherein the modulator is a frequency modulator or an amplitude modulator.

27. The method of claim 25, wherein the modulator encodes a time-varying signal, and wherein analyzing the detected vibrations comprises demodulating a signal which represents vibrations from the timepiece to determine the signal encoded by the modulator.

28. The method of claim 25, further comprising comparing the determined encoded signal with reference information for the timepiece to authenticate the timepiece.

29. The method of claim 28, further comprising determining an authenticity of the timepiece based on the comparison.

30. The method of claim 25, wherein the signal encoded by the modulator conveys an identifier for identifying the timepiece, for example a serial number of the timepiece.

31. The method of claim 21, wherein the transducer of the timepiece is not used for time keeping purposes.

32. The method according to claim 21, wherein the transducer emits a vibration at a resonant frequency, and wherein the transducer and the quartz resonator have different resonant frequencies.

33. The method of claim 1, further comprising storing at least one characteristic of the detected vibrations to create a reference for authenticating the timepiece.

34. The method of claim 33, wherein the at least one characteristic comprises one or more of a resonant frequency, a period of the detected vibrations, one or more component frequencies of the detected vibrations, a magnitude of the detected vibrations, a temporal variation of the period of the detected vibrations, a temporal variation of the frequency of the detected vibrations, and a temporal variation of the magnitude of the detected vibrations.

35. The method according to claim 33, wherein the at least one characteristic is stored in a database.

36. The method of claim 1, wherein the quartz resonator regulates the time kept by the timepiece.

37. A timepiece authentication system for authenticating a timepiece, wherein the timepiece comprises a quartz resonator for emitting a vibration at a resonant frequency, wherein the timepiece authentication system comprises a detector for detecting vibrations of the timepiece resulting from the vibration of the quartz resonator, and wherein the system is suitable for carrying out the method of claim 1.

38. The timepiece authentication system of claim 37, wherein the detector comprises a transducer for converting the vibrations into an electrical signal for analysis.

39. The timepiece authentication system of claim 37, wherein the system further comprises a processor for processing the electrical signal.

40. A computer-implemented method of authenticating a timepiece which comprises a quartz resonator for emitting a vibration at a resonant frequency, wherein the method comprises:

analyzing detected vibrations of the timepiece resulting from the vibration of the quartz resonator for determining the authenticity of the timepiece, wherein analysing detected vibrations comprises comparing the detected vibrations with reference information for the timepiece; and determining the authenticity of the timepiece based on the comparison.

41. The computer-implemented method according to claim 40, wherein analyzing the detected vibrations of the timepiece comprises determining one or more component frequencies of the vibrations.

42. The computer-implemented method of claim 40, wherein analysing the detected vibrations of the timepiece comprises identifying a resonant frequency of the quartz resonator.

43. The computer-implemented method of claim 42, further comprising comparing the identified resonant frequency with a reference resonant frequency for the timepiece.

44. The computer-implemented method of claim 40, wherein the timepiece comprises a modulator for modulating the vibration of the quartz resonator and/or wherein the timepiece comprises a transducer for emitting a vibration and a modulator for modulating the vibration of the transducer to encode a signal in the vibrations of the timepiece, wherein the method comprises analyzing the detected vibrations to determine the signal encoded by the modulator or modulators.

45. The computer-implemented method of claim 44, wherein analyzing the detected vibrations comprises demodulating a signal which represents the vibrations of the timepiece to determine the encoded signal.

46. A method of creating a reference information for authenticating a timepiece which comprises a quartz resonator, comprising detecting vibrations of said timepiece resulting from the vibration of the quartz resonator, and storing at least one characteristic of the detected vibrations to create the reference information for authenticating the timepiece, and preferably wherein the at least one characteristic comprises one or more of a resonant frequency, a period of the detected vibrations, one or more component frequencies of the detected vibrations, a magnitude of the detected vibrations, a temporal variation of the period of the detected vibrations, a temporal variation of the frequency of the detected vibrations, and a temporal variation of the magnitude of the detected vibrations.

* * * * *